(12) United States Patent
Vaishnav et al.

(10) Patent No.: US 11,327,167 B2
(45) Date of Patent: May 10, 2022

(54) HUMAN TARGET TRACKING SYSTEM AND METHOD

(71) Applicant: Infineon Technologies AG, Neubiberg (DE)

(72) Inventors: Prachi Vaishnav, Munich (DE); Avik Santra, Munich (DE)

(73) Assignee: Infineon Technologies AG, Neubiberg (DE)

( * ) Notice: Subject to any disclaimer, the term of this patent is extended or adjusted under 35 U.S.C. 154(b) by 269 days.

(21) Appl. No.: 16/570,190

(22) Filed: Sep. 13, 2019

(65) Prior Publication Data
US 2021/0080557 A1 Mar. 18, 2021

(51) Int. Cl.
*G01S 13/72* (2006.01)
*G01S 13/58* (2006.01)

(52) U.S. Cl.
CPC .......... *G01S 13/723* (2013.01); *G01S 13/584* (2013.01)

(58) Field of Classification Search
None
See application file for complete search history.

(56) References Cited

U.S. PATENT DOCUMENTS

| | | | |
|---|---|---|---|
| 4,241,347 A | 12/1980 | Albanese et al. | |
| 6,147,572 A | 11/2000 | Kaminski et al. | |
| 6,414,631 B1 | 7/2002 | Fujimoto | |
| 6,636,174 B2 | 10/2003 | Arikan et al. | |
| 7,048,973 B2 | 5/2006 | Sakamoto et al. | |
| 7,057,564 B2 | 6/2006 | Tsai et al. | |
| 7,171,052 B2 | 1/2007 | Park | |
| 7,317,417 B2 | 1/2008 | Arikan et al. | |
| 7,596,241 B2 | 9/2009 | Rittscher et al. | |
| 7,692,574 B2 | 4/2010 | Nakagawa | |
| 7,873,326 B2 | 1/2011 | Sadr | |
| 7,889,147 B2 | 2/2011 | Tam et al. | |

(Continued)

FOREIGN PATENT DOCUMENTS

| CN | 1463161 A | 12/2003 |
|---|---|---|
| CN | 1716695 A | 1/2006 |

(Continued)

OTHER PUBLICATIONS

"BT24MTR11 Using BGT24MTR11 in Low Power Applications 24 GHz Rader," Application Note AN341, Revision: Rev 1.0, Infineon Technologies AG, Munich, Germany, Dec. 2, 2013, 25 pages.

(Continued)

*Primary Examiner* — Whitney Moore
(74) *Attorney, Agent, or Firm* — Slater Matsil, LLP

(57) ABSTRACT

In an embodiment, a method for tracking human targets includes: receiving radar signals using a radar sensor; generating a range-Doppler map based on the received radar signals; detecting a human target based on the range-Doppler map, where detecting the human target includes determining a range and a bounding box dimension of a bounding box bounding the detected human target, the bounding box at least partially surrounding the detected human target; and when the determined range is inside an expected region associated to a track, adding to the track a new detection point including the determined range and bounding box dimension, where the expected region is determined based on bounding box dimensions of detection points of the track.

21 Claims, 17 Drawing Sheets

(56) References Cited

U.S. PATENT DOCUMENTS

| | | |
|---|---|---|
| 8,228,382 B2 | 7/2012 | Pattikonda |
| 8,497,805 B2 | 7/2013 | Rofougaran et al. |
| 8,659,369 B2 | 2/2014 | Rofougaran et al. |
| 8,731,502 B2 | 5/2014 | Salle et al. |
| 8,836,596 B2 | 9/2014 | Richards et al. |
| 8,847,814 B2 | 9/2014 | Himmelstoss et al. |
| 8,860,532 B2 | 10/2014 | Gong et al. |
| 8,976,061 B2 | 3/2015 | Chowdhury |
| 9,172,132 B2 | 10/2015 | Kam et al. |
| 9,182,476 B2 | 11/2015 | Wintermantel |
| 9,202,105 B1 | 12/2015 | Wang et al. |
| 9,229,102 B1 | 1/2016 | Wright et al. |
| 9,413,079 B2 | 8/2016 | Kamgaing et al. |
| 9,495,600 B2 | 11/2016 | Heu et al. |
| 9,886,095 B2 | 2/2018 | Pothier |
| 9,935,065 B1 | 4/2018 | Baheti et al. |
| 10,795,012 B2 | 10/2020 | Santra et al. |
| 2003/0179127 A1 | 9/2003 | Wienand |
| 2004/0238857 A1 | 12/2004 | Beroz et al. |
| 2006/0001572 A1 | 1/2006 | Gaucher et al. |
| 2006/0049995 A1 | 3/2006 | Imaoka et al. |
| 2006/0067456 A1 | 3/2006 | Ku et al. |
| 2007/0210959 A1 | 9/2007 | Herd et al. |
| 2008/0106460 A1* | 5/2008 | Kurtz ............... G01S 13/34 342/99 |
| 2008/0238759 A1 | 10/2008 | Carocari et al. |
| 2008/0291115 A1 | 11/2008 | Doan et al. |
| 2008/0308917 A1 | 12/2008 | Pressel et al. |
| 2009/0073026 A1 | 3/2009 | Nakagawa |
| 2009/0085815 A1 | 4/2009 | Jakab et al. |
| 2009/0153428 A1 | 6/2009 | Rofougaran et al. |
| 2009/0315761 A1 | 12/2009 | Walter et al. |
| 2010/0207805 A1 | 8/2010 | Haworth |
| 2011/0299433 A1 | 12/2011 | Darabi et al. |
| 2012/0087230 A1 | 4/2012 | Guo et al. |
| 2012/0092284 A1 | 4/2012 | Rofougaran et al. |
| 2012/0116231 A1 | 5/2012 | Liao et al. |
| 2012/0195161 A1 | 8/2012 | Little et al. |
| 2012/0206339 A1 | 8/2012 | Dahl |
| 2012/0265486 A1 | 10/2012 | Klofer et al. |
| 2012/0268314 A1 | 10/2012 | Kuwahara et al. |
| 2012/0280900 A1 | 11/2012 | Wang et al. |
| 2013/0027240 A1 | 1/2013 | Chowdhury |
| 2013/0106673 A1 | 5/2013 | McCormack et al. |
| 2014/0028542 A1 | 1/2014 | Lovitt et al. |
| 2014/0070994 A1 | 3/2014 | Schmalenberg et al. |
| 2014/0145883 A1 | 5/2014 | Baks et al. |
| 2014/0324888 A1 | 10/2014 | Xie et al. |
| 2014/0327568 A1* | 11/2014 | Van Ommeren ..... G01S 13/424 342/146 |
| 2015/0181840 A1 | 7/2015 | Tupin, Jr. et al. |
| 2015/0185316 A1 | 7/2015 | Rao et al. |
| 2015/0212198 A1 | 7/2015 | Nishio et al. |
| 2015/0243575 A1 | 8/2015 | Strothmann et al. |
| 2015/0277569 A1 | 10/2015 | Sprenger et al. |
| 2015/0313531 A1 | 11/2015 | Tupin, Jr. et al. |
| 2015/0325925 A1 | 11/2015 | Kamgaing et al. |
| 2015/0346820 A1 | 12/2015 | Poupyrev et al. |
| 2015/0348821 A1 | 12/2015 | Iwanaga et al. |
| 2015/0364816 A1 | 12/2015 | Murugan et al. |
| 2016/0018511 A1 | 1/2016 | Nayyar et al. |
| 2016/0041617 A1 | 2/2016 | Poupyrev |
| 2016/0041618 A1 | 2/2016 | Poupyrev |
| 2016/0061942 A1 | 3/2016 | Rao et al. |
| 2016/0061947 A1 | 3/2016 | Patole et al. |
| 2016/0098089 A1 | 4/2016 | Poupyrev |
| 2016/0103213 A1 | 4/2016 | Ikram et al. |
| 2016/0109566 A1 | 4/2016 | Liu et al. |
| 2016/0118353 A1 | 4/2016 | Ahrens et al. |
| 2016/0135655 A1 | 5/2016 | Ahn et al. |
| 2016/0146931 A1 | 5/2016 | Rao et al. |
| 2016/0146933 A1 | 5/2016 | Rao et al. |
| 2016/0178730 A1 | 6/2016 | Trotta et al. |
| 2016/0187462 A1 | 6/2016 | Altus et al. |
| 2016/0191232 A1 | 6/2016 | Subburaj et al. |
| 2016/0223651 A1 | 8/2016 | Kamo et al. |
| 2016/0240907 A1 | 8/2016 | Haroun |
| 2016/0249133 A1 | 8/2016 | Sorensen |
| 2016/0252607 A1 | 9/2016 | Saboo et al. |
| 2016/0259037 A1 | 9/2016 | Molchanov et al. |
| 2016/0266233 A1 | 9/2016 | Mansour |
| 2016/0269815 A1 | 9/2016 | Liao et al. |
| 2016/0291130 A1 | 10/2016 | Ginsburg et al. |
| 2016/0299215 A1 | 10/2016 | Dandu et al. |
| 2016/0306034 A1 | 10/2016 | Trotta et al. |
| 2016/0320852 A1 | 11/2016 | Poupyrev |
| 2016/0320853 A1 | 11/2016 | Lien et al. |
| 2016/0327633 A1 | 11/2016 | Kumar Y.B. et al. |
| 2016/0334502 A1 | 11/2016 | Ali et al. |
| 2016/0349845 A1 | 12/2016 | Poupyrev et al. |
| 2017/0033062 A1 | 2/2017 | Liu et al. |
| 2017/0045607 A1 | 2/2017 | Bharadwaj et al. |
| 2017/0052618 A1 | 2/2017 | Lee et al. |
| 2017/0054449 A1 | 2/2017 | Mani et al. |
| 2017/0060254 A1 | 3/2017 | Molchanov et al. |
| 2017/0070952 A1 | 3/2017 | Balakrishnan et al. |
| 2017/0074974 A1 | 3/2017 | Rao et al. |
| 2017/0074980 A1 | 3/2017 | Adib et al. |
| 2017/0090014 A1 | 3/2017 | Subburaj et al. |
| 2017/0090015 A1 | 3/2017 | Breen et al. |
| 2017/0115377 A1 | 4/2017 | Giannini et al. |
| 2017/0131395 A1 | 5/2017 | Reynolds et al. |
| 2017/0139036 A1 | 5/2017 | Nayyar et al. |
| 2017/0141453 A1 | 5/2017 | Waelde et al. |
| 2017/0170947 A1 | 6/2017 | Yang |
| 2017/0176574 A1 | 6/2017 | Eswaran et al. |
| 2017/0192847 A1 | 7/2017 | Rao et al. |
| 2017/0201019 A1 | 7/2017 | Trotta |
| 2017/0212597 A1 | 7/2017 | Mishra |
| 2017/0364160 A1 | 12/2017 | Malysa et al. |
| 2018/0046255 A1 | 2/2018 | Rothera et al. |
| 2018/0071473 A1 | 3/2018 | Trotta et al. |
| 2018/0101239 A1 | 4/2018 | Yin et al. |

FOREIGN PATENT DOCUMENTS

| | | |
|---|---|---|
| CN | 101490578 A | 7/2009 |
| CN | 101585361 A | 11/2009 |
| CN | 102788969 A | 11/2012 |
| CN | 102967854 A | 3/2013 |
| CN | 103529444 A | 1/2014 |
| CN | 203950036 U | 11/2014 |
| DE | 102008054570 A1 | 6/2010 |
| DE | 102011100907 A1 | 1/2012 |
| DE | 102011075725 A1 | 11/2012 |
| DE | 102014118063 A1 | 7/2015 |
| EP | 2602638 A1 | 6/2013 |
| GB | 2247799 A | 3/1992 |
| JP | 2001174539 A | 6/2001 |
| JP | 2004198312 A | 7/2004 |
| JP | 2006234513 A | 9/2006 |
| JP | 2008029025 A | 2/2008 |
| JP | 2008089614 A | 4/2008 |
| JP | 2009069124 A | 4/2009 |
| JP | 2011529181 A | 12/2011 |
| JP | 2012112861 A | 6/2012 |
| JP | 2013521508 A | 6/2013 |
| JP | 2014055957 A | 3/2014 |
| KR | 20090063166 A | 6/2009 |
| KR | 20140082815 A | 7/2014 |
| WO | 2007060069 A1 | 5/2007 |
| WO | 2013009473 A2 | 1/2013 |
| WO | 2016033361 A1 | 3/2016 |

OTHER PUBLICATIONS

Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.

(56) References Cited

OTHER PUBLICATIONS

Chen, Xiaolong et al., "Detection and Extraction of Target with Micromotion in Spiky Sea Clutter via Short-Time Fractional Fourier Transform", IEEE Transactions on Geoscience and Remote Sensing, vol. 52, No. 2, Feb. 2014, pp. 1002-1018.

Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.

Deacon, Peter et al., "Frequency Modulated Continuous Wave (FMCW) Radar," Design Team 6 Technical Lecture, Nov. 9, 2011, 27 pages.

Dham, Vivek "Programming Chirp Parameters in TI Radar Devices," Application Report SWRA553, Texas Instruments, May 2017, 15 pages.

Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.

Dooring Alert Systems, "Riders Matter," http:\\dooringalertsystems.com, printed Oct. 4, 2017, 16 pages.

Filippelli, Mario et al., "Respiratory dynamics during laughter," J Appl Physiol, (90), 1441-1446, Apr. 2001, http://jap.physiology.org/content/jap/90/4/1441.full.pdf.

Fox, Ben, "The Simple Technique That Could Save Cyclists' Lives," https://www.outsideonline.com/2115116/simple-technique-could-save-cyclists-lives, Sep. 19, 2016, 6 pages.

Gu, Changzhan et al., "Assessment of Human Respiration Patterns via Noncontact Sensing Using Doppler Multi-Radar System", Sensors Mar. 2015, 15(3), 6383-6398, doi: 10.3390/s150306383, 17 pages.

Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.

Inac, Ozgur et al., "A Phased Array RFIC with Built-In Self-Test Capabilities," IEEE Transactions on Microwave Theory and Techniques, vol. 60, No. 1, Jan. 2012, 10 pages.

Ahtiainen, J. et al., "Radar based detection and tracking of a walking human", IFAC Proceeding Volumes, vol. 43, Issue 16, Aug. 2010, 6 pages.

Killedar, Abdulraheem "XWRIxxx Power Management Optimizations—Low Cost LC Filter Solution," Application Report SWRA577, Texas Instruments, Oct. 2017, 19 pages.

Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 118 pages.

Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.

Lim, Soo-Chul et al., "Expansion of Smartwatch Touch Interface from Touchscreen to Around Device Interface Using Infrared Line Image Sensors," Sensors 2015, ISSN 1424-8220, vol. 15, 16642-16653, doi:10.3390/s150716642, www.mdpi.com/journal/sensors, Jul. 15, 2009, 12 pages.

Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.

Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.

Nguyen, V.D., et al., "Reducing Computational Complexity of Gating Procedures Using Sorting Algorithms", Proceedings of the 16th International Conference on Information Fusion, Jul. 9-12, 2013, 7 pages.

Qadir, Shahida G., et al., "Focused ISAR Imaging of Rotating Target in Far-Field Compact Range Anechoic Chamber," 14th International Conference on Aerospace Sciences & Aviation Technology, ASAT-14-241-IP, May 24-26, 2011, 7 pages.

Richards, Mark A., "Fundamentals of Radar Signal Processing," McGraw Hill Electronic Engineering, ISBN 0-07-144474-2, Jun. 2005, 93 pages.

Biswas, S.K., et al., "Computationally Efficient Unscented Kalman Filtering Techniques for Launch Vehicle Navigation using a Spaceborne GPS Receiver", arXiv:1611.09701v1 [cs.SY] Nov. 25, 2016, 9 pages.

Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.

Simon, W., et al., "Highly Integrated KA-Band Tx Frontend Module Including 8x8 Antenna Array," IMST GmbH, Germany, Asia Pacific Microwave Conference, Dec. 7-10, 2009, 63 pages.

Suleymanov, Suleyman, "Design and Implementation of an FMCW Radar Signal Processing Module for Automotive Applications," Master Thesis, University of Twente, Aug. 31, 2016, 61 pages.

Tchango, A.F., et al., "Tracking Multiple Interacting Targets Using a Joint Probabilistic Data Association Filter", 17th International Conference on Information Fusion (FUSION), Jul. 7-10, 2014, 8 pages.

Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.

Thayaparan, T. et al., "Intelligent target recognition using micro-Doppler radar signatures," Defence R&D Canada, Radar Sensor Technology III, Proc. of SPIE, vol. 7308, 730817, Dec. 9, 2009, 11 pages.

Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, pp. 18-34.

Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, Apr. 15, 2014, 11 pages.

Wu, Y. et al., "Unscented Kalman Filtering for Additive Noise Case: Augmented vs. Non-augmented", 2005 American Control Conference, Jun. 8-10, 2005, Portland, OR, USA, FrB02.6, 5 pages.

* cited by examiner

○ measurement at time $t_{712}$
⊙ measurement at time $t_{714}$
○ measurement at time $t_{716}$
● new measurement
■ old measurement
⊡ selected measurement
◇ estimated measurement

HUMAN TARGET TRACKING SYSTEM AND METHOD

TECHNICAL FIELD

The present disclosure relates generally to an electronic system and method, and, in particular embodiments, to a human target tracking system and method.

BACKGROUND

Applications in the millimeter-wave frequency regime have gained significant interest in the past few years due to the rapid advancement in low cost semiconductor technologies, such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications at 24 GHz, 60 GHz, 77 GHz, and 80 GHz and also beyond 100 GHz. Such applications include, for example, static and moving object detection and tracking.

In some radar systems, the distance between the radar and a target is determined by transmitting a frequency modulated signal, receiving a reflection of the frequency modulated signal (also referred to as the echo), and determining a distance based on a time delay and/or frequency difference between the transmission and reception of the frequency modulated signal. Accordingly, some radar systems include a transmit antenna to transmit the radio-frequency (RF) signal, a receive antenna to receive the RF, as well as the associated RF circuitry used to generate the transmitted signal and to receive the RF signal. In some cases, multiple antennas may be used to implement directional beams using phased array techniques. A multiple-input and multiple-output (MIMO) configuration with multiple chipsets can be used to perform coherent and non-coherent signal processing as well.

In some settings, static objects coexist with moving objects. For example, in an indoor setting, static objects, such as furniture and walls, coexist with moving objects such as humans. An indoor setting may also include object exhibiting periodic movements, such as fans. Doppler analysis has been used to distinguish between moving and static objects.

SUMMARY

In accordance with an embodiment, a method for tracking human targets includes: receiving radar signals using a radar sensor; generating a range-Doppler map based on the received radar signals; detecting a human target based on the range-Doppler map, where detecting the human target includes determining a range and a bounding box dimension of a bounding box bounding the detected human target, the bounding box at least partially surrounding the detected human target; and when the determined range is inside an expected region associated to a track, adding to the track a new detection point including the determined range and bounding box dimension, where the expected region is determined based on bounding box dimensions of detection points of the track.

In accordance with an embodiment, a millimeter-wave radar system includes: a radar sensor; and a processor. The processor is configured to: transmit radar signals using the radar sensor, receive reflected radar signals using the radar sensor, generate a range-Doppler map based on the received reflected radar signals, detect a human target based on the range-Doppler map, where detecting the human target includes determining a range and a bounding box dimension of a bounding box of the detected human target, the bounding box at least partially surrounding the detected human target, and when the determined range is inside an expected region associated to a track, add to the track a new detection point including the determined range and bounding box dimension, where the expected region is determined based on bounding box dimensions of detection points of the track.

In accordance with an embodiment, a method for simultaneously tracking a plurality of human targets includes: receiving radar signals using a radar sensor; generating a range-Doppler map based on the received radar signals; detecting a human target based on the range-Doppler map, where detecting the human target includes determining a range; generating a first expected region based on a first track associated to a first human target; generating a second expected region based on a second track associated to a second human target; when the determined range is inside the first expected region and the second expected region, adding to the first track or the second track a new detection point including the determined range using a nearest neighbor algorithm; and when the determined range is inside the first expected region and outside the second expected region, or when the determined range is inside the second expected region and outside the first expected region, adding to the first track or the second track a new detection point including the determined range using a probabilistic data association filter (PDAF).

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a system and method for detecting and tracking human targets in an indoor environment. Embodiments of the present invention may also be used to detect and track other moving objects, such as animals and robots. Some embodiments may be used outdoors.

In an embodiment of the present invention, a millimeter-wave radar is used to detect and track a human target in an indoor environment. After initial detection of targets and corresponding clustering, a bounding box is determined that surrounds the human target, such as surrounding the torso, hands, and feet of the detected human target. The dimensions of the bounding box are tracked, together with the angle of arrival of each human target, and the position, and velocity of the centroid of each human target, to estimate a gating region associated to a track. Only targets detected inside the gating region of the track are used to update the track. In some embodiments, multiple human targets are tracked simultaneously using respective tracks.

Figure 1:
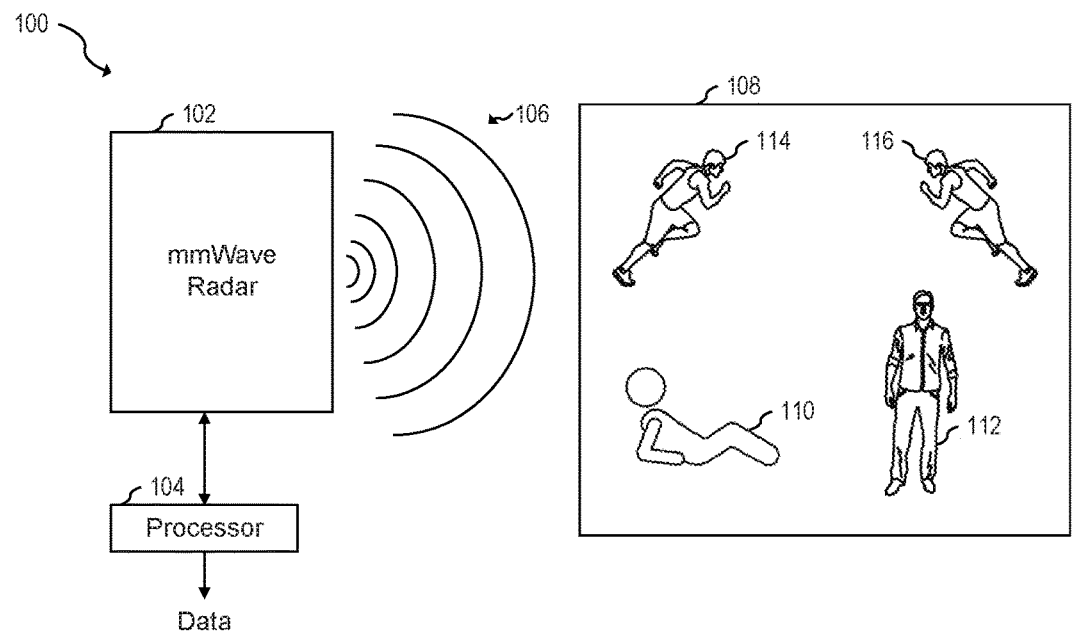
FIG. 1 shows a radar system, according to an embodiment of the present invention.

A radar, such as a millimeter-wave radar, may be used to detect and track humans. For example, FIG. 1 shows radar system 100, according to an embodiment of the present invention. Radar system 100 includes millimeter-wave radar 102 and processor 104. In some embodiments, millimeter-wave radar 102 includes processor 104.

During normal operation, millimeter-wave radar 102 transmits a plurality of radiation pulses 106, such as chirps, towards scene 108. In some embodiments the chirps are linear chirps (i.e., the instantaneous frequency of the chirp varies linearly with time).

The transmitted radiation pulses 106 are reflected by objects in scene 108. The reflected radiation pulses (not shown in FIG. 1), which are also referred to as the echo signal, are detected by millimeter-wave radar 102 and processed by processor 104 to, for example, detect and track humans.

The objects in scene 108 may include static humans, such as lying human no, humans exhibiting low and infrequent motions, such as standing human 112, and moving humans, such as running or walking human 114 and 116. The objects in scene 108 may also include static objects, such as furniture and periodic movement equipment (not shown). Other objects may also be present in scene 108.

Processor 104 analyses the echo data to determine the location of humans using signal processing techniques. For example, in some embodiments, a range FFT is used for estimating the range component of the location of a detected human (e.g., with respect to the location of the millimeter-wave radar). The azimuth component of the location of the detected human may be determined using angle estimation techniques.

In some embodiments, a range-Doppler map (image) is generated from the echo data, and a two-dimensional (2D) moving target identification (MTI) is performed on the range-Doppler map to detect moving targets.

Processor 104 may be implemented as a general purpose processor, controller or digital signal processor (DSP) that includes, for example, combinatorial circuits coupled to a memory. In some embodiments, the DSP may be implemented with an ARM architecture, for example. In some embodiments, processor 104 may be implemented as a custom application specific integrated circuit (ASIC). In some embodiments, processor 104 includes a plurality of processors, each having one or more processing cores. In other embodiments, processor 104 includes a single processor having one or more processing cores. Other implementations are also possible. Some embodiments may be implemented as a combination of hardware accelerator and software running on a DSP or general purpose microcontroller.

Millimeter-wave radar 102 operates as a FMCW radar that includes a millimeter-wave radar sensor circuit, a transmitting antenna, and at least two receiving antennas. Millimeter-wave radar 102 transmits and receives signals in the 20 GHz to 122 GHz range. Alternatively, frequencies outside of this range, such as frequencies between 1 GHz and 20 GHz, or frequencies between 122 GHz, and 300 GHz, may also be used.

In some embodiments, the echo signals received by the receiving antennas of millimeter-wave radar 102 are filtered and amplified using band-pass filter (BPFs), low-pass filter (LPFs), mixers, low-noise amplifier (LNAs), and intermediate frequency (IF) amplifiers in ways known in the art. The echo signals are then digitized using one or more analog-to-digital converters (ADCs) for further processing. Other implementations are also possible.

Detecting and tracking human target(s) in an indoor environment may be desirable for a variety of reasons. Conventional methods for tracking a target assume that that the target is a single point in the range-Doppler map. In a conventional range-Doppler processing chain, the cluster of detections obtained is used to obtain a single bin in a range-Doppler image to determine range and Doppler components of the target detected. Such single bin is then fed into the tracker for tracking the target. For example, in conventional radar signal processing, the range, Doppler and angle of arrival may be detected for the single point target. Such components are then fed into the tracker for tracking purposes.

The motion model for a conventional tracker may be expressed as $$\begin{cases} px(k+1) = px(k) + \Delta t \cdot vx(k) \\ py(k+1) = py(k) + \Delta t \cdot vy(k) \\ vx(k+1) = vx(k) \\ vy(k+1) = vy(k) \end{cases} \quad (1)$$

where k represents a discrete time step, $\Delta t$ is the time between each time step, px is the position of the target in the x direction, py is the position of the target in the y direction, vx is the velocity of the target in the x direction, and vy is the velocity of the target in the y direction.

Figure 2:
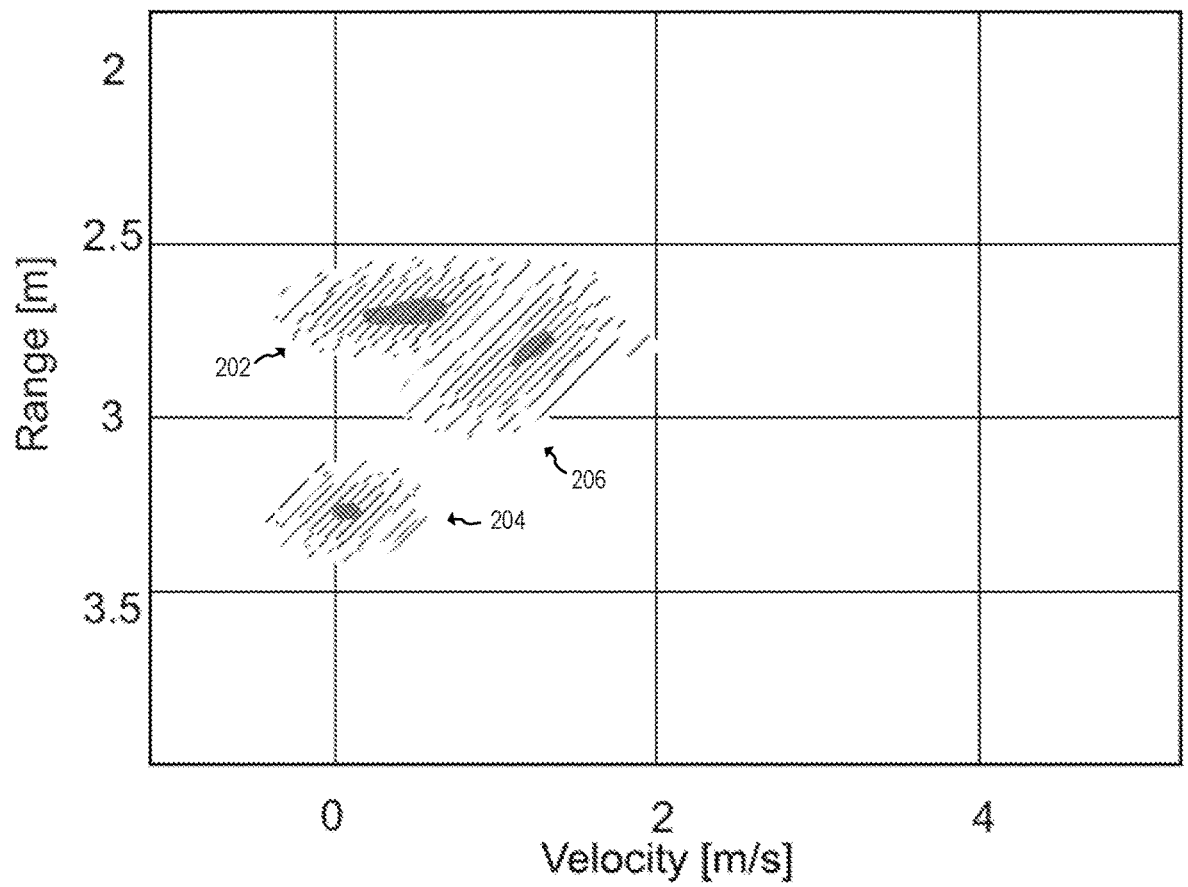
FIG. 2 shows a range-Doppler map of a moving human captured with a millimeter-wave radar system, according to an embodiment of the present invention.

In some radar systems, such as in a millimeter-wave radar system, a human target may exhibit a double spread across range and Doppler bins as reflections are received from different parts of the human body during movement of the human target. For example, FIG. 2 shows a range-Doppler map of a moving human captured with a millimeter-wave radar system, according to an embodiment of the present invention. As shown in FIG. 2, a human target may exhibit peaks at different locations of the range-Doppler map corresponding to different portions of the human target body, such as the right foot 204, left foot 202, and torso and hands 206.

Figure 3A:
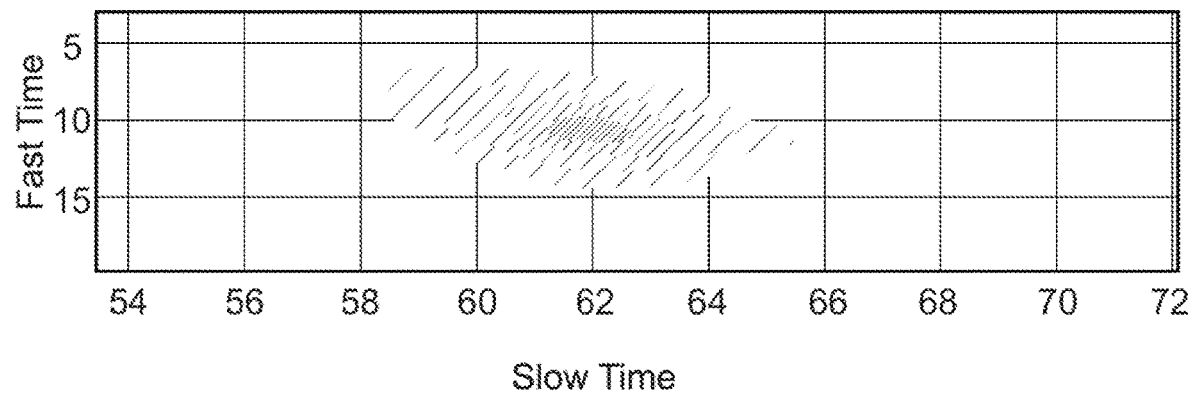
FIGS. 3A and 3B show fast-time versus slow-time maps of the range-Doppler response of a human target after pre-processing, and after target detection and clustering, respectively, according to an embodiment of the present invention.
Figure 3B:
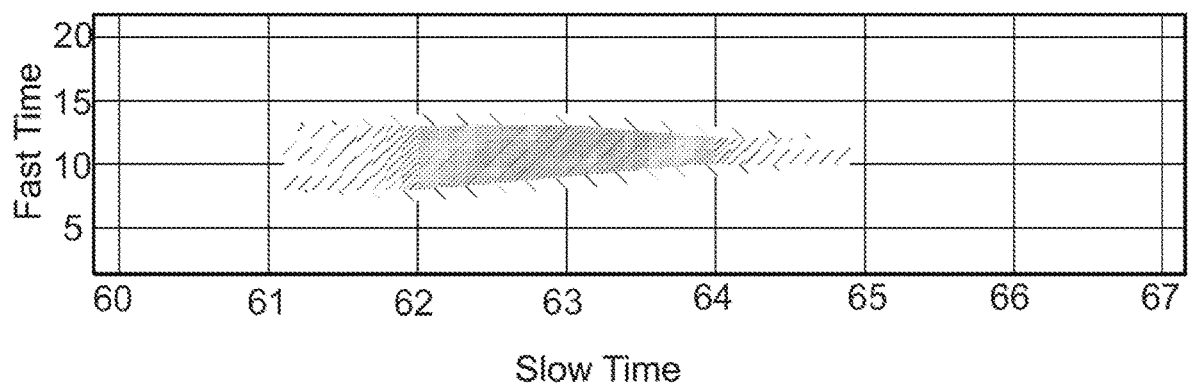

A human target may exhibit a spread in Doppler and also over range bins in a range-Doppler map. For example, FIGS. 3A and 3B show fast-time versus slow-time maps of the range-Doppler response of a human target after pre-processing, and after target detection and clustering, respectively, according to an embodiment of the present invention. Such spread contains information about micromotions of the human target. Such spread, therefore, may be used to improve performance of a subsequent tracker and also to track the micromotions of the human target.

In an embodiment, a bounding box surrounds the spread in Doppler and range of a human target. The perimeter and area of the bounding box is dynamically adjusted to track changes in the spread in Doppler and range of the human target. One or more dimensions of the bound box are determined and tracked to advantageously enhance detection and tracking of human targets.

Figure 4A:
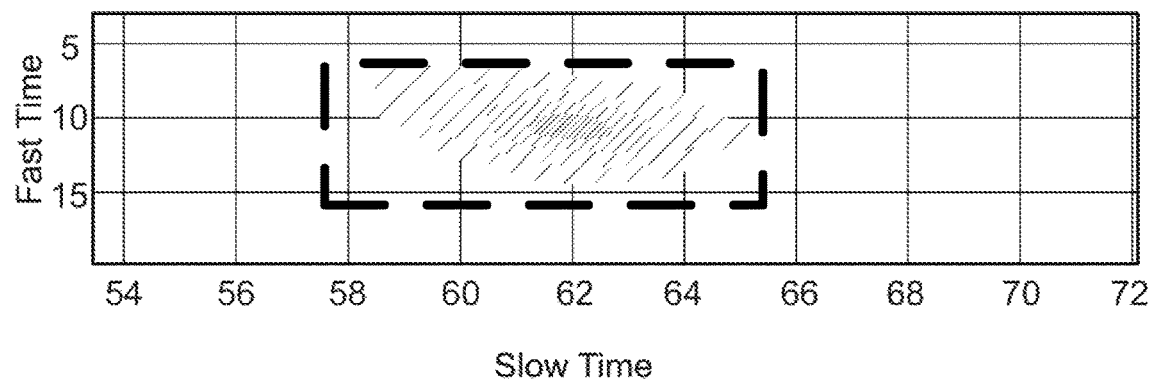
FIGS. 4A and 4B show the fast-time versus slow-time maps of the range-Doppler response of the human target of FIGS. 3A and 3B, respectively, with respective bounding boxes, according to an embodiment of the present invention.
Figure 4B:
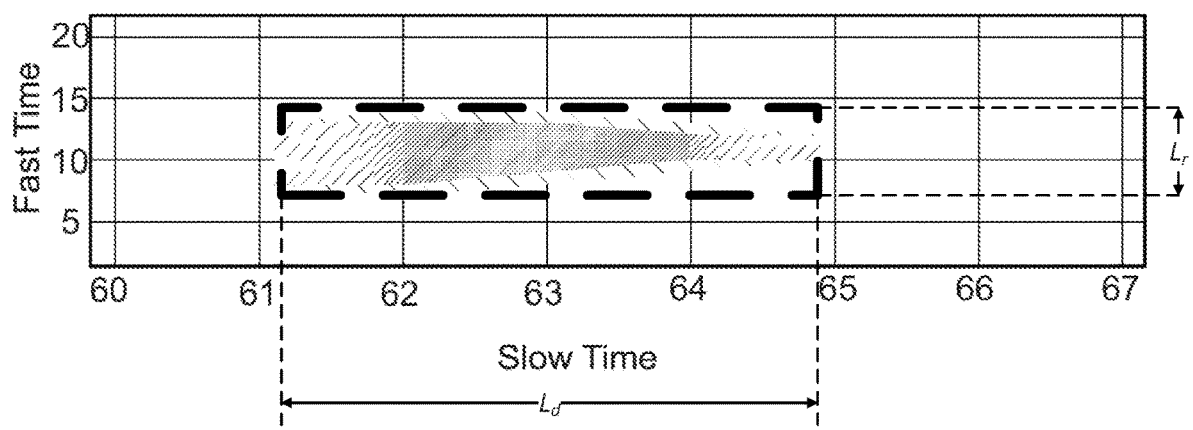

A bounding box, such as a bounding box with a rectangle shape, may surround the spread in Doppler and range of a target. For example, FIGS. 4A and 4B show the fast-time versus slow-time maps of the range-Doppler response of the human target of FIGS. 3A and 3B, respectively, with respective bounding boxes, according to an embodiment of the present invention. As shown in FIGS. 4A and 4B, the bounding box has a range dimension $L_r$, which extends from the minimum range to the maximum range of the spread in range of the human target, and a Doppler dimension $L_d$, which extends from the minimum Doppler velocity to the maximum Doppler velocity of the spread in Doppler of the human target.

In some embodiments, the bounding box may have a shape different than a rectangle, such as a circle, ellipse, or an arbitrary shape. For example, in some embodiments, the bounding box is a circle having a center at the centroid of the range-Doppler spread of the human target and radius equal to the minimum radius that surrounds the range-Doppler spread of the human target.

In some embodiments, one or more of the bounding box dimensions are determined and tracked to enhance human target detection and tracking. For example, in some embodiments, a coordinated turn motion model for bounding box where the rate of change in angle of arrival of the target $\omega(k)$ is zero may be given by $$\begin{cases} px(k+1) = px(k) + \Delta t \cdot v_c(k) \cdot \cos(\theta(k)) \\ py(k+1) = py(k) + \Delta t \cdot v_c(k) \cdot \sin(\theta(k)) \\ lx(k+1) = lx(k) + vlx(k) \cdot \Delta t \\ ly(k+1) = ly(k) + vly(k) \cdot \Delta t \\ vlx(k+1) = vlx(k) \\ vly(k+1) = vly(k) \\ v_c(k+1) = v_c(k) \\ \theta(k+1) = \theta(k) + \Delta t \cdot \omega(k) \\ \omega(k+1) = \omega(k) \end{cases} \quad (2)$$

where k represents a discrete time step, $\Delta t$ is the time between each time step, px is the position of the centroid of the human target in the x direction, py is the position of the centroid of the human target in the y direction, lx is the bounding box dimension in the x direction, ly is the bounding box dimension in the y direction, vlx is the rate of change in the x dimension of the bounding box, vly is the rate of change in the y dimension of the bounding box, $v_c$ is the radial velocity of the centroid of the human target, $\theta$ is the angle of arrival of the human target, and $\omega$ is the rate of change of the angle of arrival (AoA) of the human target.

In an embodiment, parameters px, py, lx, ly, vlx, vly, $v_c$, $\theta$, and $\omega$ represent states of a tracker (e.g., implemented with a Kalman filter, such as the unscented Kalman filter) that tracks a human target with a track. These states may be obtained from measurements of millimeter-wave radar system 100. For example, in an embodiments, millimeter-wave radar system 100 measures r (range of the target from the millimeter-wave radar sensor), $\theta$ (angle of arrival—angle of the target), $v_c$ (radial velocity of the target), $L_r$ (bounding box dimension across range), and $L_d$ (bounding box dimension across Doppler). These measurements may collectively be referred to as $$Zmeas=(r,\theta,v_c,L_r,L_d) \quad (3)$$

The Zmeas measurements may be converted into states of the tracker by $$\begin{cases} px = r \cdot \cos(\theta) \\ py = r \cdot \sin(\theta) \\ lx = L_r \\ ly = L_d \\ \theta = \theta \\ v_c = v_c \end{cases} \quad (4)$$

where $\omega$, vlx, and vly are initialized as zero.

At each time step, a new set of measurements Zmeas is collected, and the track is updated based on such new set of measurements Zmeas. For example, the, e.g., unscented Kalman filter computes (for the track) predicted states px, py, lx, ly, vlx, vly, $v_c$, $\theta$, and $\omega$, for every time step (e.g., using Equation 2). Due to Bayes recursive approach, these states may embody information from all measurements available from time 1:k—all measurements of the track). Such predicted states may be converted into the form of a predicted measurement by $$Zpred = (r = \sqrt{px^2+py^2}, \theta, v_c, lx, ly) \quad (5)$$

The Mahalanobis distance may be computed between the predicted measurements Zpred and a new set of measurements Zmeas by $$Md = \sqrt{(Zpred-Zmeas)S^{-1}(Zpred-Zmeas)^T} \quad (6)$$

where S is the covariance matrix between Zmeas and Zpred.

In some embodiments, the new set of measurement Zmeas is considered a valid measurement of the target being tracked by the track if the distance Md is lower than a predetermined threshold. The multi-dimensional region in which the distance Md is lower than the predetermined threshold is referred to as the gating region or expected region associated to the track.

When the rate of change in angle of arrival of the human target $\omega(k)$ is different than zero, a coordinated turn motion model for bounding box may be given by $$\begin{cases} px(k+1) = px(k) + \frac{v_c(k)}{\omega(k)} \cdot (\sin(\theta(k)) + \omega(k)\Delta t) - \sin(\theta(k))) \\ py(k+1) = py(k) + \frac{v_c(k)}{\omega(k)} \cdot (-\cos(\theta(k)) + \omega(k)\Delta t) + \cos(\theta(k))) \\ lx(k+1) = lx(k) + vlx(k) \cdot \Delta t \\ ly(k+1) = ly(k) + vly(k) \cdot \Delta t \\ vlx(k+1) = vlx(k) \\ vly(k+1) = vly(k) \\ v_c(k+1) = v_c(k) \\ \theta(k+1) = \theta(k) + \Delta t \cdot \omega(k) \\ \omega(k+1) = \omega(k) \end{cases} \quad (7)$$

A coordinated turn motion model that includes noise parameters may be given by $$x(k+1) = \begin{bmatrix} px(k) \\ py(k) \\ lx(k) \\ ly(k) \\ vlx(k) \\ vly(k) \\ v_c(k) \\ \theta(k) \\ \omega(k) \end{bmatrix} + \begin{bmatrix} \frac{1}{2} \cdot \Delta t^2 \cdot \cos(\theta(k)) \cdot a_p(k) \\ \frac{1}{2} \cdot \Delta t^2 \cdot \sin(\theta(k)) \cdot a_p(k) \\ \frac{1}{2} \cdot \Delta t^2 \cdot \cos(\theta(k)) \cdot a_l(k) \\ \frac{1}{2} \cdot \Delta t^2 \cdot \sin(\theta(k)) \cdot a_l(k) \\ \Delta t \cdot \cos(\theta(k)) \cdot a_l(k) \\ \Delta t \cdot \sin(\theta(k)) \cdot a_l(k) \\ \Delta t \cdot a_p(k) \\ \frac{1}{2} \cdot \Delta t^2 \cdot a_\theta(k) \\ \Delta t \cdot a_\theta(k) \end{bmatrix} \quad (8)$$

where $a_p(k)$ denotes the acceleration of the centroid of the target, $a_l(k)$ denotes the acceleration of the bound box dimension, $a_\theta(k)$ denotes acceleration of the angle of arrival, and where $$\begin{cases} a_p(k) = \dot{v}_c(k) \\ a_l(k) = \dot{v}_b(k) \\ v_b(k) = \sqrt{vlx^2 + vly^2} \\ a_\theta = \dot{\omega}(k) \end{cases} \quad (9)$$

Figure 5:
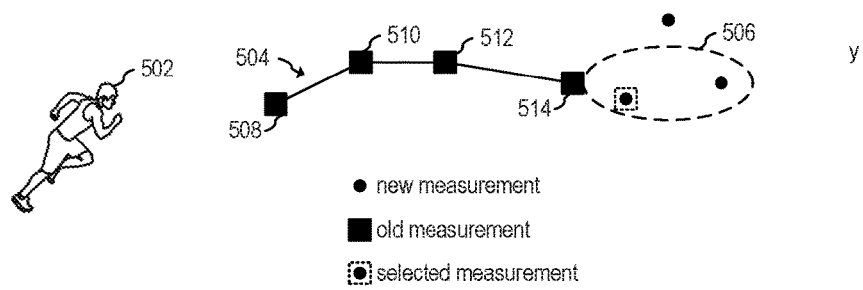
FIG. 5 shows a track of a location of a human target, according to an embodiment of the present invention.

As shown in Equations 2-9, the coordinated turn motion model tracks the angle of arrival of the human target and the dimensions of the bounding box, along with the position and velocity of the centroid of the human target. Using a coordinated turn motion model, such as shown in Equations 2-9 advantageously allows for accurate tracking of a human target that moves in a human way (e.g., accelerating, decelerating, turning, changing direction, extending arms and/or legs, exhibiting random motions, etc.). For example, FIG. 5 shows track 504 of a location of human target 502, according to an embodiment of the present invention.

Track 504 includes detection points 508, 510, 512, and 514. Each detection point includes, directly or indirectly, parameter values, such as range, angle of arrival, velocity, and bounding box dimensions. For example, with respect to Equation 2, each of detection point 508, 510, 512, and 514 may correspond to k values 0, 1, 2, and 3, and each may include corresponding values for px, py, lx, ly, vlx, vly, and $v_c$, $\theta$, and $\omega$, which may be used to calculate corresponding values for r, $\theta$, $v_c$, $L_r$, and $L_d$. As shown in FIG. 5, gating region 506 surrounds a region of possible locations of human target 502 based on the history of track 504. Gating region 506 is generated based on a coordinated turn motion model, such as shown in Equations 2-9. For example, in some embodiments, the dimensions of the gating regions may be determined based on Euclidean distance and/or Mahalanobis distance calculated based on the coordinated turn motion model and the history of track 504.

When determining the next location of human target 502, only targets detected inside gating region 506 are considered. Targets detected outside gating region 506 are ignored.

The determination of which of the targets detected inside gating region 506 corresponds to human target 502 (being tracked by track 504) is based on the history of track 504. For example, in some embodiments, a data association algorithm, such as nearest neighbor, Munkres algorithm, and/or probabilistic data association filter (PDAF) may be used. Other data association algorithms may also be used.

In some embodiments, the human target may be tracked with tracking algorithms such as using a Kalman filter. Since a human target may exhibit random motions, some embodiments use the unscented Kalman filter to track a human target. The unscented Kalman filter, together with the coordinated turn model (e.g., as shown in Equations 2-9), advantageously allows for accurate tracking of non-linear motions of the human target (which may be difficult to track using Gaussian approximations). Other tracking algorithms may also be used.

Figure 6:
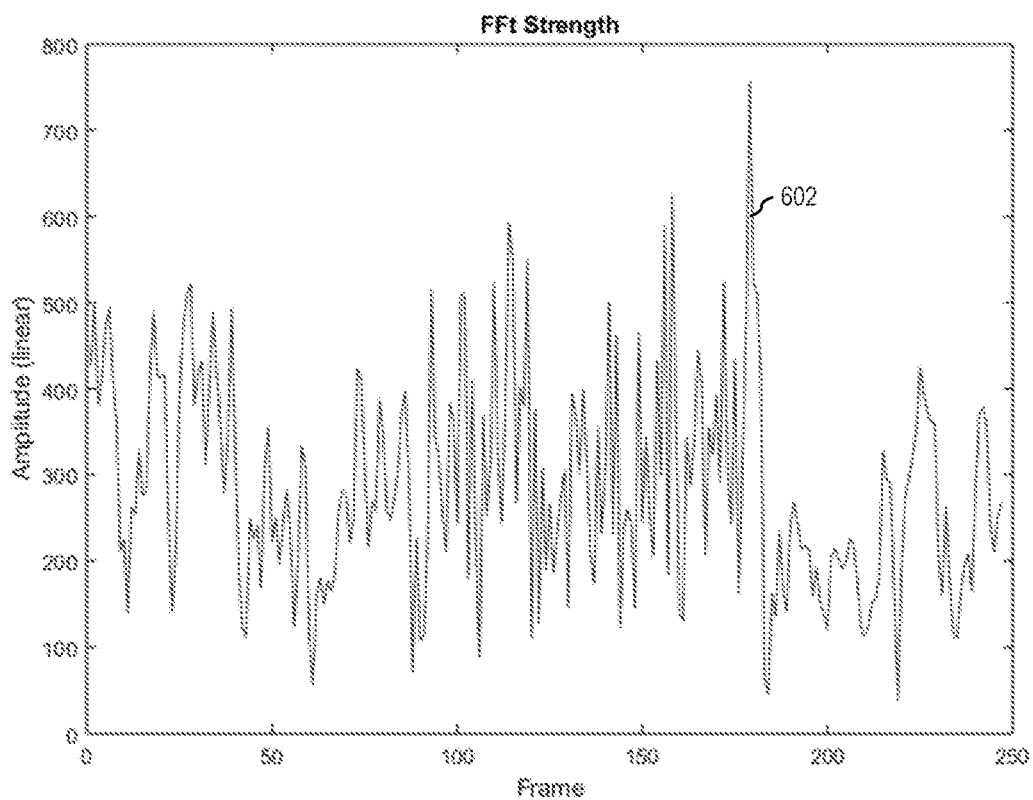
FIG. 6 shows the signal strength of a standing human target, according to an embodiment of the present invention.

When tracking a human target, it is possible that in some instances the human target is not detected. For example, the human target may be undetected because the human target moved to a location outside the field of view of the radar. Another reason for failing to detect a human target is because the signal strength of the signals reflected in a human target may fluctuate over time, being weaker that a detection threshold in some instances. For example, FIG. 6 shows the signal strength of a standing human target, according to an embodiment of the present invention.

As shown by curve 602, even a standing human may exhibit variations of signal strength over time. In some embodiments, the track of a human target is kept alive despite failing to detect the human target in one or more instances. For example, FIG. 7A shows track 704 of a location of human target 702, according to an embodiment of the present invention.

Figure 7A:
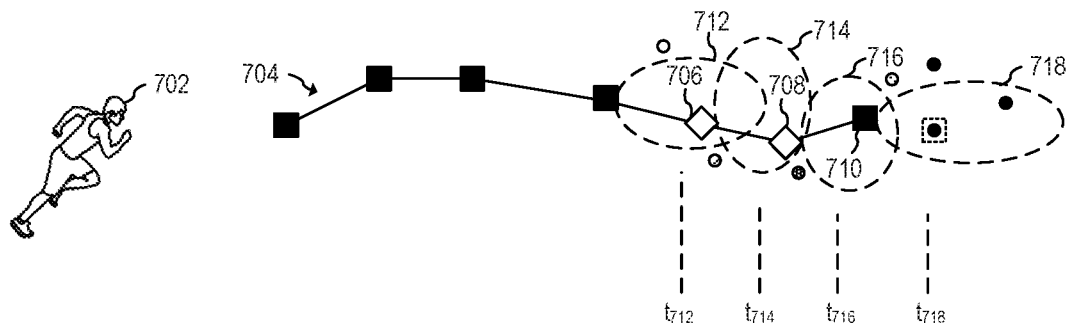
FIG. 7A shows a track of a location of a human target, according to embodiments of the present invention.

As shown in FIG. 7A, human target 702 was not detected in two instances (no targets were detected inside gating regions 712 and 714). The tracking algorithm keeps track 704 alive using predicted locations 706 and 708 based on the history of track 704 instead of actual measurements when human target 702 is not detected. Once a target falls inside the gating region of a predicted location (e.g., target 710 is detected inside gating region 716 based on estimated location 708 of human target 702 and the history of track 704), the target can be associated with track 704.

Keeping a track alive for a number of missing detections advantageously avoids losing tracks each time a missing detection occurs, and, therefore, helps cope with intermittent missing measurement from a human target. In some embodiments, the track is kept alive for a predetermined number of detection attempts. For example, in some embodiments, the track is kept alive for 10 unsuccessful detection attempts. Some embodiments may keep a track alive for a larger number of unsuccessful detection attempts, such as 15, 18, 24, 50, or higher. Other embodiments may keep a track alive for a smaller number of unsuccessful detection attempts, such as 8, 6, or lower.

In some embodiments, the track is kept alive by using a counter. For example, in an embodiment, a countdown counter is started when a track fails to detect the corresponding human target. The countdown counter is reset when a successful detection is assigned to the track. If the counter reaches zero (in other words, no successful detections occurred since the countdown counter was started), the track is killed. In some embodiments, the countdown counter takes a few seconds (e.g., 3, seconds, 15 seconds, 20 seconds, or more), to reach zero. Some embodiments may use a counter that counts up, where the track is killed when the counter reaches a predetermined threshold. Other methods for counting the time in which no successful detections have been achieved may be used.

Figure 7B:
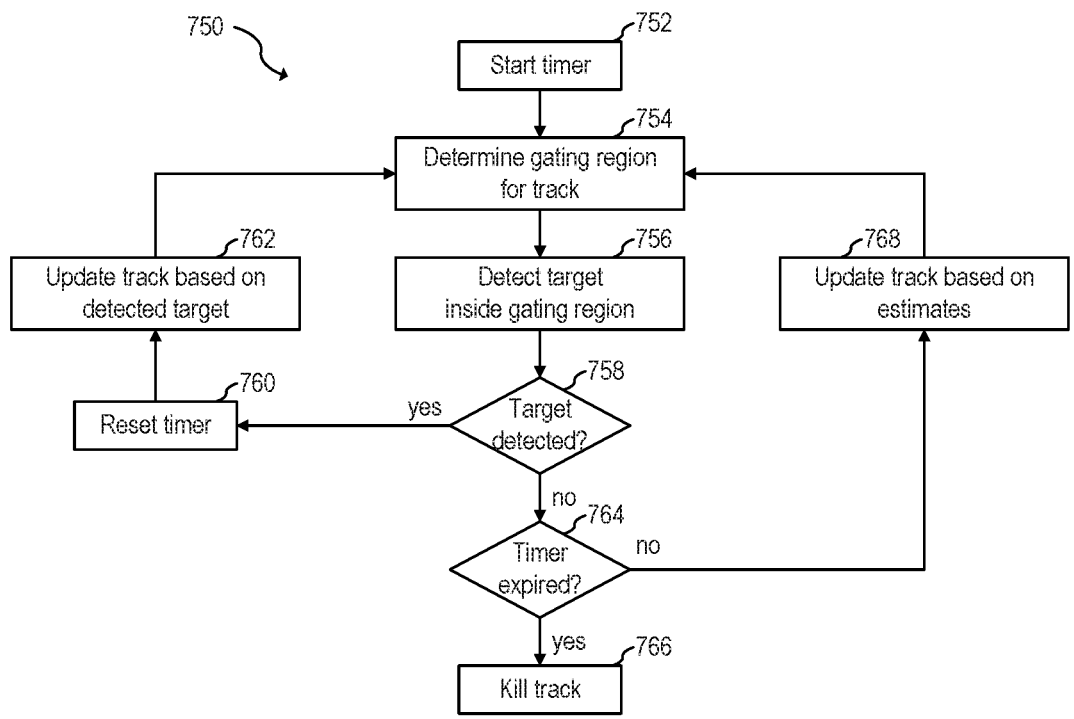
FIG. 7B shows a flow chart of an embodiment method for determining whether to keep a track of a human target alive, according to an embodiment of the present invention.

FIG. 7B shows a flow chart of embodiment method 750 for determining whether to keep a track of human target alive, according to an embodiment of the present invention. Method 750 may be implemented, e.g., by millimeter-wave radar system 100. Method 750 will be explained with reference to FIG. 7A. However, it is understood that FIG. 7A shows a non-limiting example of a track of a location of human target, according to an embodiment of the present invention.

During step 752, a timer is started. The timer may be implemented with a digital counter that counts up or down. In some embodiments, the timer may be implemented with an analog circuit. Implementations of timers are well known in the art.

During step 754, a gating region is determined based on the history of track 704. For example, gating region 712 is determined based on the history of measurements of track 704 that occurred prior to time $t_{712}$ using, e.g., one or more of Equations 2-9.

During step 756, targets are detected inside the gating region. During step 758, a determination is made as to whether targets were detected inside the gating region. For example, at time $t_{718}$, two targets are detected inside gating region 718.

If targets are detected inside the gating region, the timer is reset during step 760, and track 704 is updated based on the detected target during step 762. If targets are not detected inside the gating region, the timer is checked during step 764 to determine whether the timer expired. If it is determined during step 764 that the timer has not expired, track 704 is updated based on estimates during step 768, where the estimates may be determined using, e.g., Equations 2-9. If it is determined during step 764 that the timer has expired, the track 704 is killed during step 766.

The expiration of the timer may be indicated, e.g., when the counter reaches a predetermined threshold. For example, in some embodiments, a timer expires when a count-down counter reaches zero. In other embodiments, a timer expires when a count-up timer reaches a predetermined threshold. Other implementations are also possible.

It is possible that non-human targets appear in the field of view of the radar system. Such non-human targets may be, e.g., other moving objects, and/or ghost targets. In some embodiments, a track is killed when only M or less detections are successful out of the first N attempts to detect the human target. For example, in an embodiment where N is 8 and M is 4, a track is only kept alive if 5 or more successful detections are achieved out of the first 8 attempts to detect a human target. For example, FIG. 8A shows a non-limiting example where of tracks 804 and 814 of locations of respective human targets 802 and 812, where N is 8 and M is 4, according to an embodiment of the present invention.

Figure 8A:
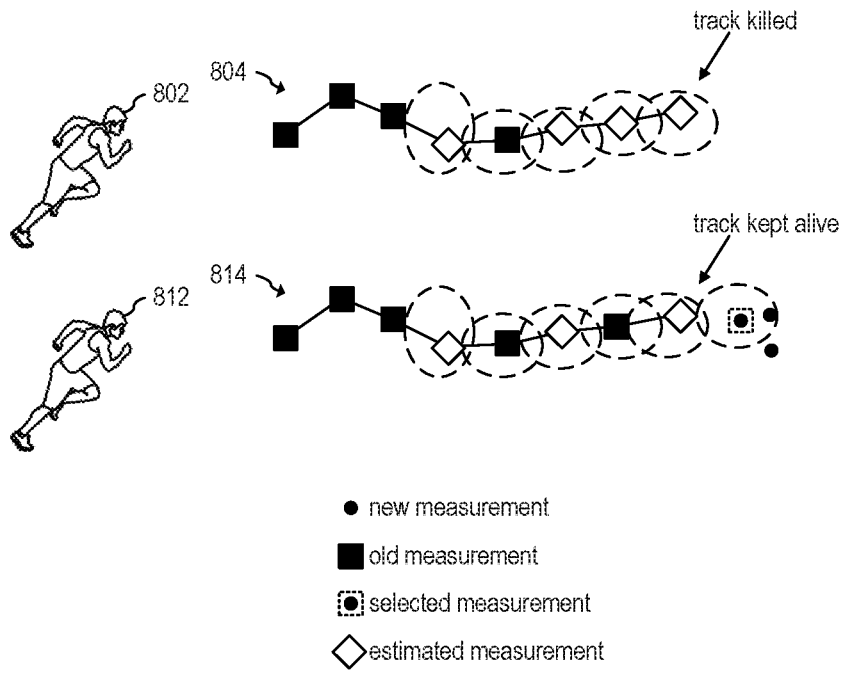
FIG. 8A shows track of a location of a human target, according to embodiments of the present invention.

As shown in FIG. 8A, track 804 is killed when less than 5 successful detections are achieved out of the first 8 detection attempts. Track 814 is kept alive because there were at least 5 successful detections out of the first 8 detections attempts.

Figure 8B:
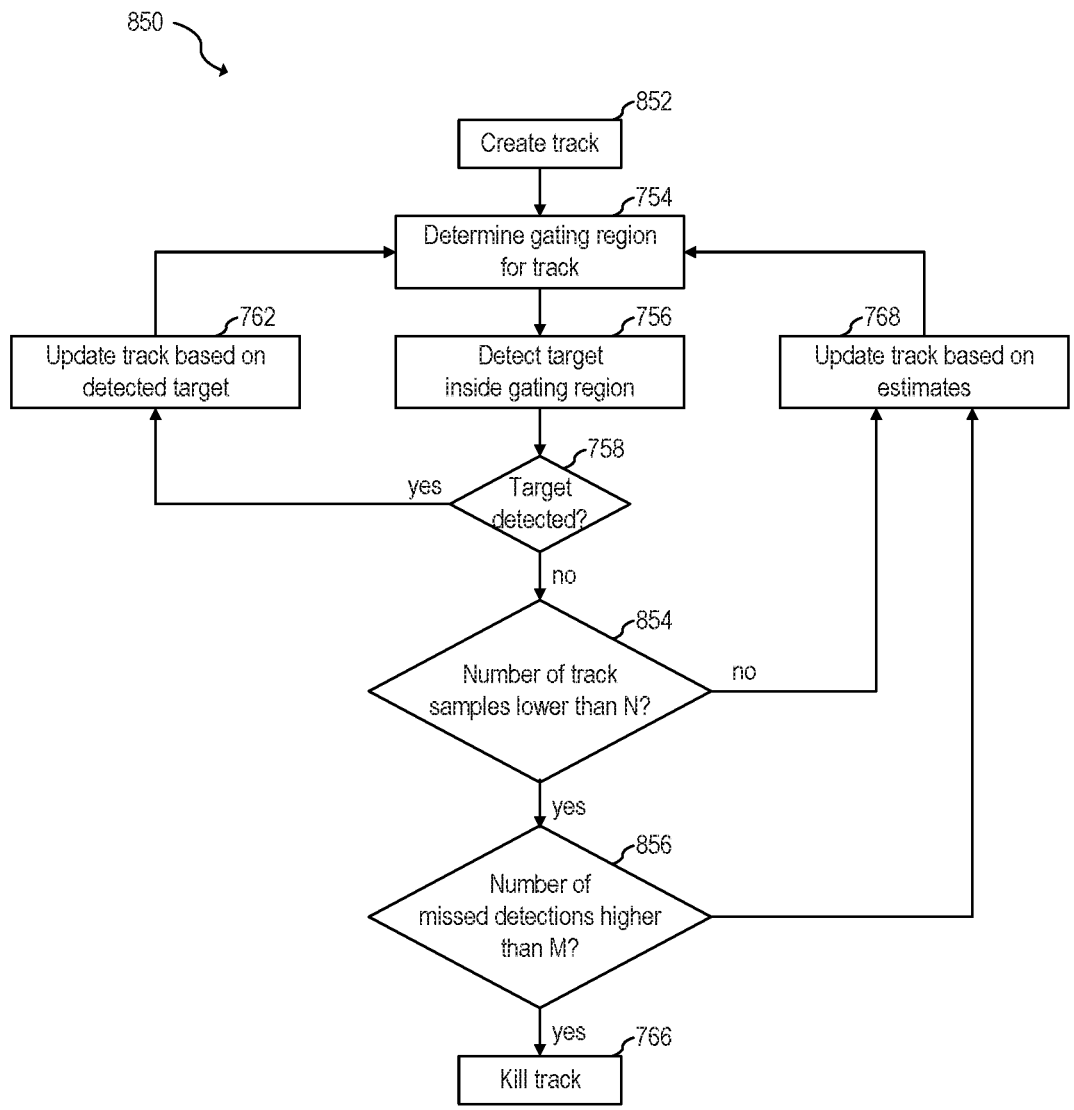
FIG. 8B shows a flow chart of an embodiment method for determining whether to keep a track of a human target alive, according to an embodiment of the present invention.

FIG. 8B shows a flow chart of embodiment method 850 for determining whether to keep a track of human target alive, according to an embodiment of the present invention. Method 850 may be implemented, e.g., by millimeter-wave radar system 100. Method 850 will be explained with reference to FIG. 8A. However, it is understood that FIG. 8A shows a non-limiting example of a track of a location of human target, according to an embodiment of the present invention.

During step 852, a track is created (e.g., when a target is detected in the field of view of millimeter-wave radar 102). Steps 754, 756, 758, 762, 766, and 768 are performed in a similar manner as described with respect to FIG. 7B.

During step 854, the number of track samples (detection points) since the creation of the track is determined. If the number of track samples since the track's creation is lower than a threshold N, then the number of missed detection of the track is determined during step 856. If the number of missed detection is higher than a threshold M, then the track is killed during step 766. In some embodiments, N is equal to 8 and M is equal to 3. Other values of M and N may also be used.

Figure 9A:
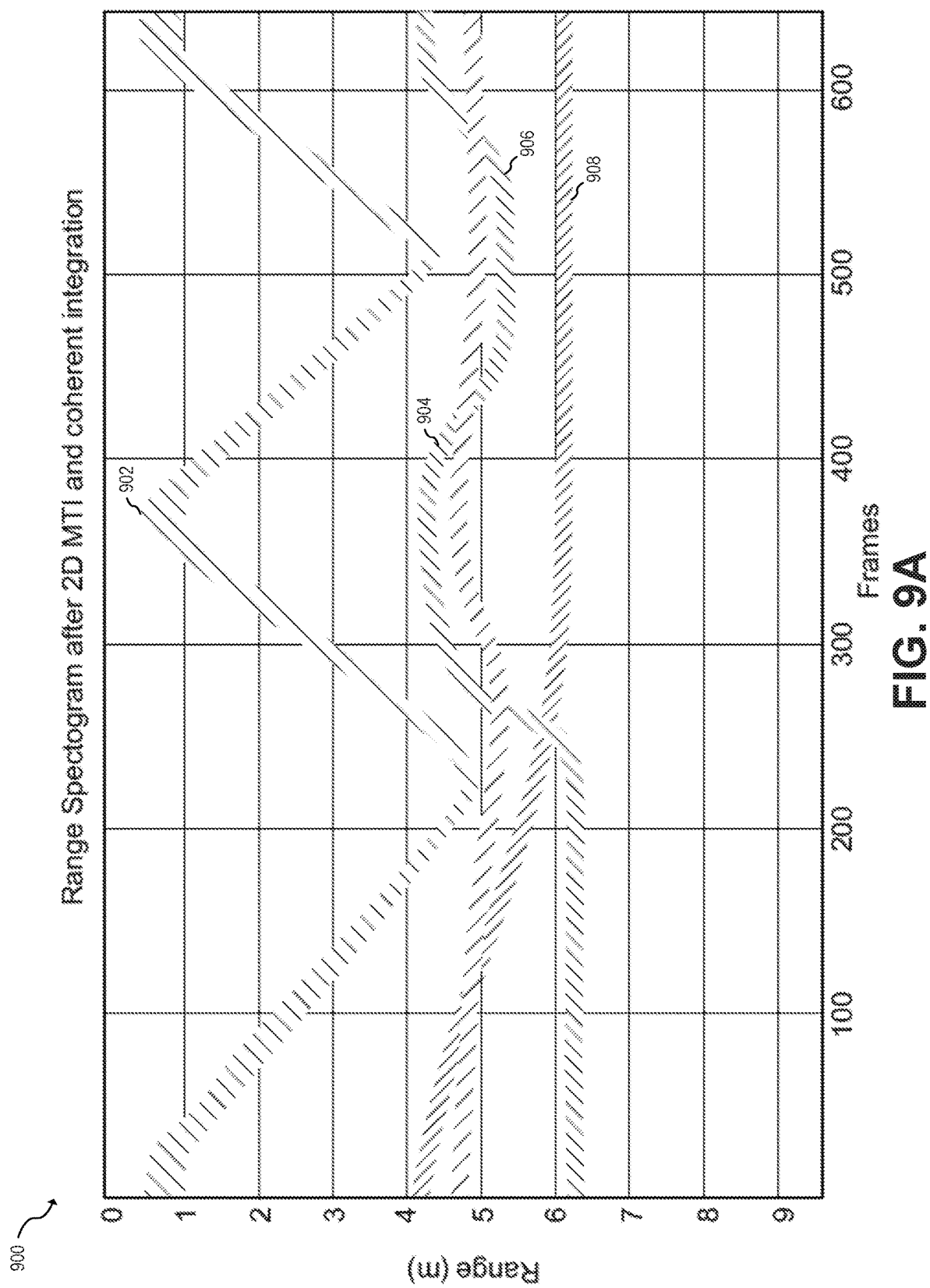
FIG. 9A shows a range spectrogram of a human target moving in a zigzag manner in an indoor environment surrounded by walls, according to an embodiment of the present invention.

When detecting and tracking a human target, multipath reflections from static objects, such as walls and chairs, may appear as real targets along with the actual human target. Such ghost targets exhibit characteristics similar to those of real human targets, and, therefore, may be confused with human targets. For example, FIG. 9A shows range spectrogram 900 of a human target moving in a zigzag manner in an indoor environment surrounded by walls, after 2D MTI filtering and coherent integration, according to an embodiment of the present invention. As shown in FIG. 9A, the human target moves closer and away from the radar sensor over time. The top curve 902 corresponds to the actual human target. The bottom curves 904, 906, and 908 are reflections received by the radar.

As shown in FIG. 9A, continuous multi-path reflections are obtained from a wall even after applying moving target indication (MTI) filters to remove static objects. Such multipath reflections may be hard to distinguish from real human targets, as they exhibit Doppler signatures similar to a human target and may be difficult to remove by conventional moving target annihilators, such as MTI filters.

As shown in FIG. 9A, the bottom curves 904, 906, and 908, which correspond to multipath reflections, are highly correlated with the top curve 902, which corresponds to the actual human target (direct path signal). In an embodiment of the present invention, multipath reflections are removed when the correlation between tracks is higher than a predetermined threshold (such as, e.g., 0.6). Out of the tracks exhibiting high correlation with each other, the track that is closer to the radar (e.g., the top curve in FIG. 9A) is kept alive, and the other tracks (e.g., the bottom curves) are killed.

Figure 9B:
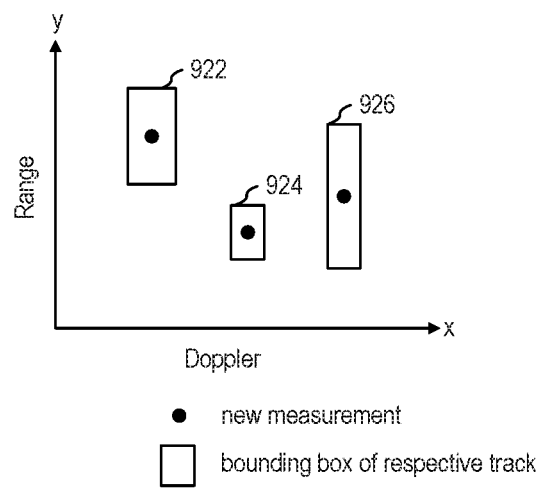
FIG. 9B shows three bounding boxes of three different tracks, respectively, according to an embodiment of the present invention.

FIG. 9B shows three bounding boxes of three different tracks, respectively, according to an embodiment of the present invention. In some embodiments, the slow time data (phase) corresponding to the range bins for each of the bounding boxes are taken. In some embodiments, the discrete cosine transform (DCT) and phase of each bounding box are evaluated over a number of consecutive time snapshots (e.g., 5 time snapshots). If a high correlation is found between tracks (e.g., higher than 0.6), the track that is closer to the radar is kept alive while the track that is further from the radar is killed. For example, in an embodiment, the correlation factor may be given by $$F = \frac{\sum (R_1 - M_1)(R_2 - M_2)}{\sqrt{\sum (R_1 - M_1)^2 \sum (R_2 - M_2)^2}} \quad (10)$$

where $$\begin{cases} R_1 = RDImage(r_1, :) \\ R_2 = RDImage(r_2, :) \\ M_1 = \text{mean}(R_1) \\ M_2 = \text{mean}(R_2) \end{cases} \quad (11)$$

where RDImage is a range-Doppler image (e.g., after 2D MTI filtering and coherent integration, such as FIG. 9A), $R_1$ is slow time data for target 1, $R_2$ is slow time data for target 2, $r_1$ is the centroid range bin of the bounding box of target 1, and $r_2$ is the centroid range bin of the bounding box of target 2. In an embodiment, if F is greater than 0.6, the track associated with the target with the minimum of $r_1$ and $r_2$ is kept alive while the other track is killed.

Figure 10:
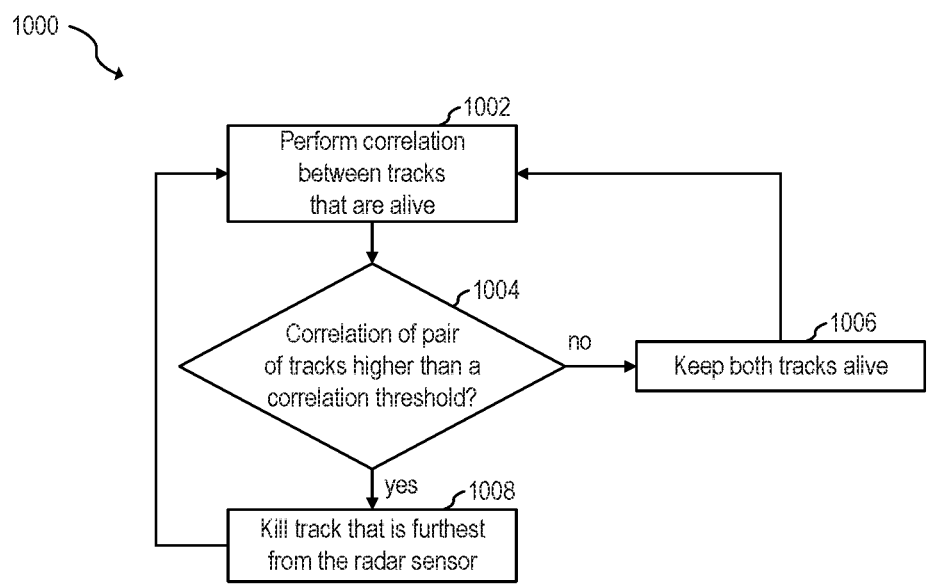
FIG. 10 shows a flow chart of an embodiment method for removing ghost tracks, according to an embodiment of the present invention.

FIG. 10 shows a flow chart of embodiment method 1000 for removing ghost tracks, according to an embodiment of the present invention. Method 1000 may be implemented, e.g., by millimeter-wave radar system 100. Method 1000 will be explained with reference to FIGS. 9A and 9B. However, it is understood that FIGS. 9A and 9B show non-limiting examples of tracks, according to embodiments of the present invention.

During step 1002, a correlation value is obtained between each pair of tracks that are alive (e.g., using Equation 10). For example, if tracks A, B, and C are alive, a correlation is obtained for pair AB, pair BC, and pair AC. During step 1004, the correlation value is compared with a predetermined correlation threshold. In some embodiments, the predetermined correlation threshold may be 0.6, 0.65, or higher. In some embodiments, the predetermined correlation threshold may be 0.59, 0.58 or lower.

If the correlation value is lower than the predetermined correlation threshold, then both tracks are kept alive during step 1006. However, if the correlation value is higher than the predetermined correlation threshold, then the track that is furthest from the radar sensor is killed.

As a non-limiting example, if method 1000 is performed on the tracks shown in FIG. 9A, only the top curve is kept alive, while the bottom curves, which are multi-path reflections of the top curve and are, therefore, ghost curves, are killed.

In addition to the advantages of detecting and tracking the dimensions of the bounding boxes, detecting and tracking the spread in Doppler and range of a human target advantageously allows for detection of micromotions using, e.g., micro-Doppler signatures. For example, the breathing of a human target may be detected by extracting the micro-Doppler signatures from the spread in Doppler and range of a particular track. Such micromotions may be used to continue to track a human target that has gone idle (e.g., because the human target transitioned to a sitting state). For example, in some embodiments, when the track of a human target indicates that the corresponding human target stopped moving (e.g., because the human target is sitting or standing idle), the breathing of such human target (e.g., determined from micro-Doppler signatures extracted from the corresponding spread in Doppler and range) may be used to continue to detect and track such static human target. For example, in some embodiments, during step 758 (in FIG. 7B or 8B), the human target is detected when micro-Doppler signature data extracted from the spread in range and Doppler inside the area surrounded by the bounding box is indicative of the presence of the human target inside the gating area, such as by being indicative of breathing rate within normal human levels and/or a heart beat rate within normal human levels.

By using micro-Doppler signatures, a track of a human target that becomes static can be kept alive and can continue to track such human target. Breathing is one example of the micromotions that can be monitored using the spread in Doppler and range. Other micromotions, such as heart beat rate, may also be used.

Figure 11A:
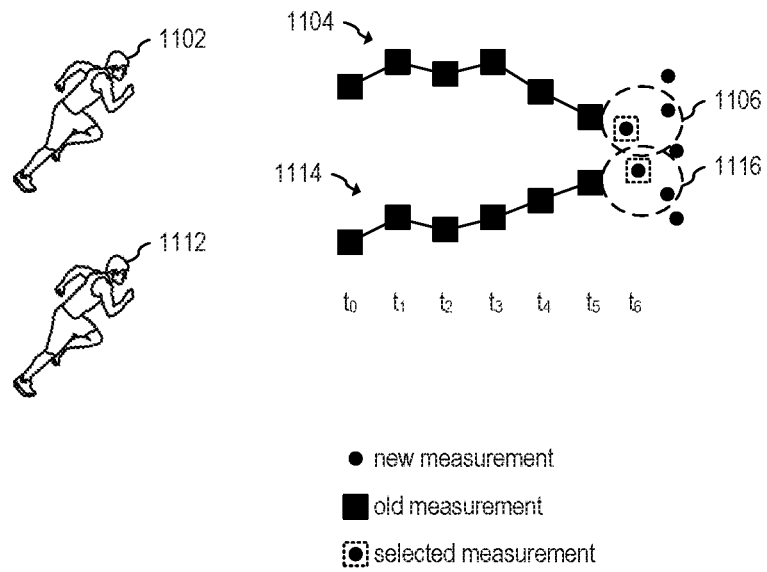
FIGS. 11A and 11B shows two tracks simultaneously tracking two human targets, respectively, according to an embodiment of the present invention.
Figure 11B:
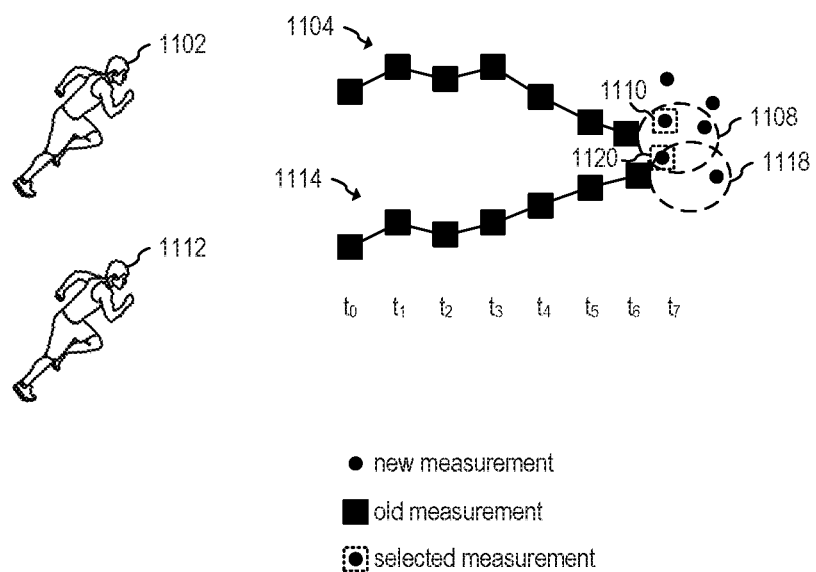

In some embodiments, multiple human targets are monitored and tracked simultaneously via corresponding tracks. For example, FIGS. 11A and 11B show tracks 1104 and 1114 tracking human targets 1102 and 1112, respectively, according to an embodiment of the present invention.

During normal operation, data association algorithms such as nearest neighbor, Munkres algorithm, and/or PDAF may be used to associated human targets to tracks based on a predetermined criteria, e.g., based on the properties of the tracks, such as history of positions, velocity, shape, angle, etc. For example, PDAF is a strong data association algorithm that works well in high clutter scenarios. For probabilistic data association, a hypothesis of each measurement for each track is considered and an update is carried out corresponding to every hypothesis. Thus, if there are, e.g., 5 tracks and 10 measurements, there are 50 hypotheses to be considered for PDAF.

When two or more tracks are close to each other, or cross, the number of hypotheses to be considered grows, thereby increasing the computational complexities of using PDAF to assign measurements to tracks.

In an embodiment of the present invention, when two or more tracks share the same measurement, a nearest neighbor approach is used where only the track that has the lowest weight for the measurement is updated while the other tracks are updated without the measurement.

For example, with respect to FIGS. 11A and 11B, PDAF is used to perform data association for measurements occurring at times $t_0$ to $t_5$. When tracks 1104 and 1114 are close to each other (e.g., when their respective gating regions touch or overlap, or are closer than a predetermined threshold), the nearest neighbor (the measurement closest to the last measurement of respective tracks) is picked. By using a fusion approach that combines PDAF with nearest neighbor, computational complexities are reduced without significantly reducing accuracy.

In some embodiments, for non-conflict scenarios (e.g., where human targets are moving sufficiently away from each other such that the gating regions of each track do not touch or overlap and are at least farther than a predetermined threshold from each other), PDAF is used to perform data association, which advantageously allows for efficiently and accurately performing data association in high clutter environments. For conflict scenarios (e.g., where gating regions of tracks of human targets touch or overlap or are closer than a predetermined threshold), nearest neighbor algorithm is used to perform data association, which advantageously reduces the number of hypothesis and hence computational complexity without substantially affecting accuracy. In some embodiments, the predetermined threshold may be 0 meters (gating regions in contact), 0.1 meters, 0.2 meters, 0.5 meters or higher).

Figure 12:
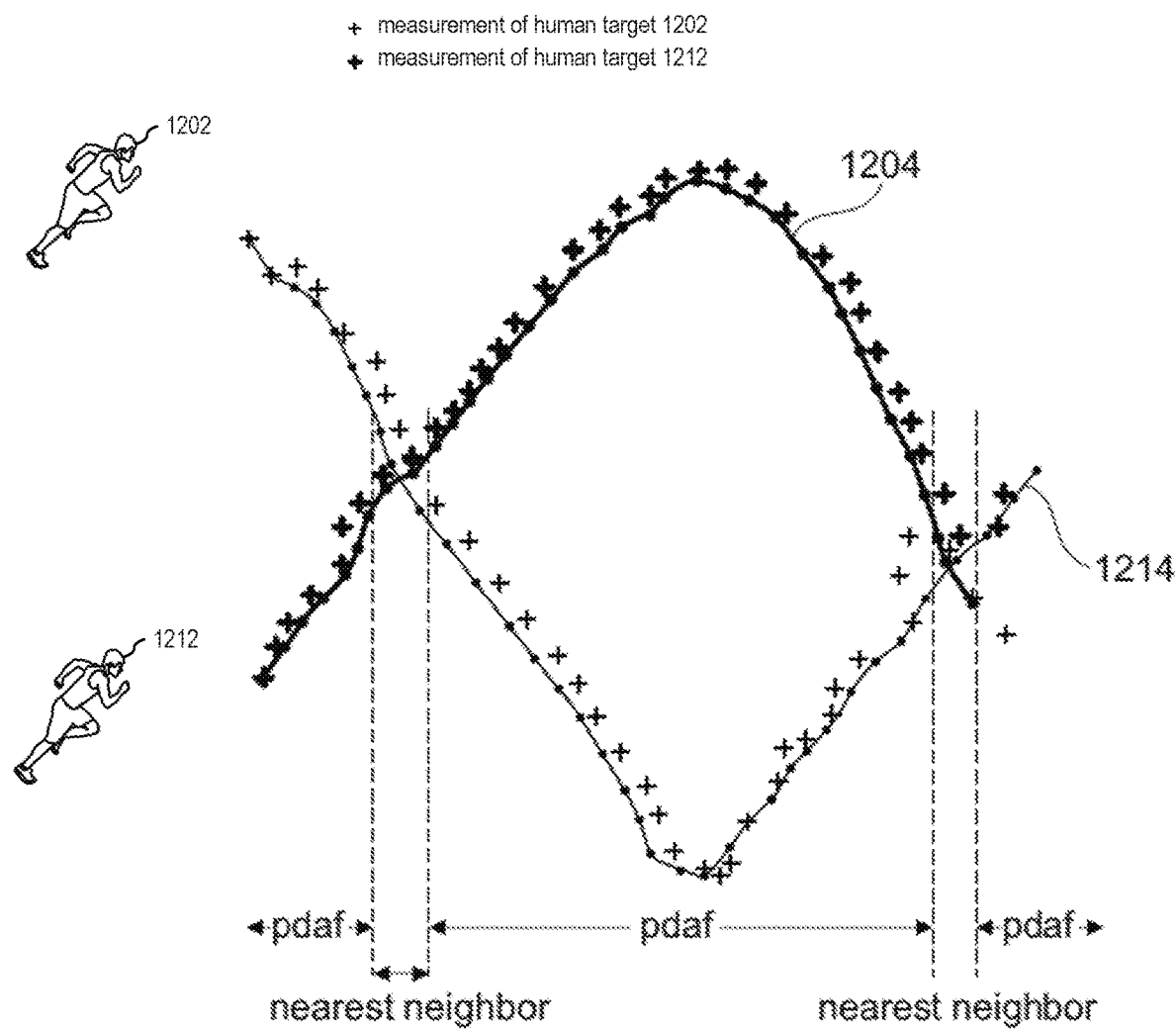
FIG. 12 shows two tracks simultaneously tracking two human targets, respectively, according to an embodiment of the present invention.

FIG. 12 shows tracks 1204 and 1214 simultaneously tracking human targets 1202 and 1212, respectively, according to an embodiment of the present invention. As shown in FIG. 12, the tracking transitions from using PDAF to using a nearest neighbor algorithm when the tracks become close to each other.

Figure 13:
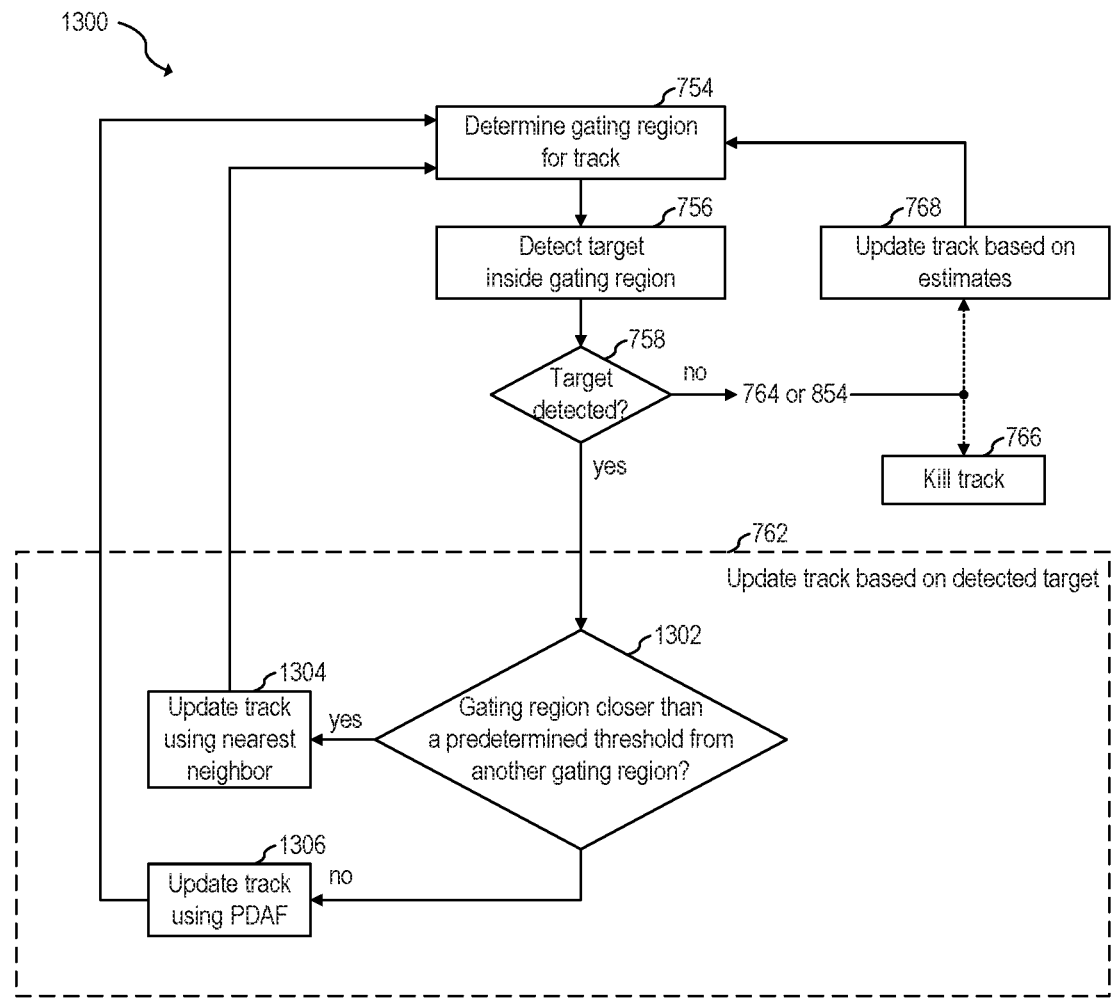
FIG. 13 shows a flow chart of an embodiment method for simultaneously tracking multiple human targets, according to an embodiment of the present invention.

FIG. 13 shows a flow chart of embodiment method 1300 for simultaneously tracking multiple human targets, according to an embodiment of the present invention. Method 1300 may be implemented, e.g., by millimeter-wave radar system 100. Method 1300 will be explained with reference to FIGS. 11A, 11B and 12. However, it is understood that FIGS. 11A, 11B and 12 show non-limiting examples of tracks, according to embodiments of the present invention.

Steps 754, 756, 758, 764, 768, 854 and 766 may be performed in a similar manner as described with respect to methods 750 and/or 850. During step 1302, a determination is made as to whether the gating region of the track is closer than a predetermined threshold from another gating region of another track (e.g., using Euclidean distance and/or Mahalanobis distance). In some embodiments, step 1302 returns a "yes" only if the gating regions overlap. For example, in some embodiments, during step 1302, it is determined whether the detected target is inside the gating region of the track and also within the gating region of another track. If the detected target is within the gating region of both tracks, then nearest neighbor algorithm is used to assign the detected target to the nearest track during step 1304.

If step 1302 returns a "yes," the track is updated using nearest neighbor algorithm during step 1304. If step 1302 returns a "no," the track is updated using PDAF during step 1306.

Figure 14:
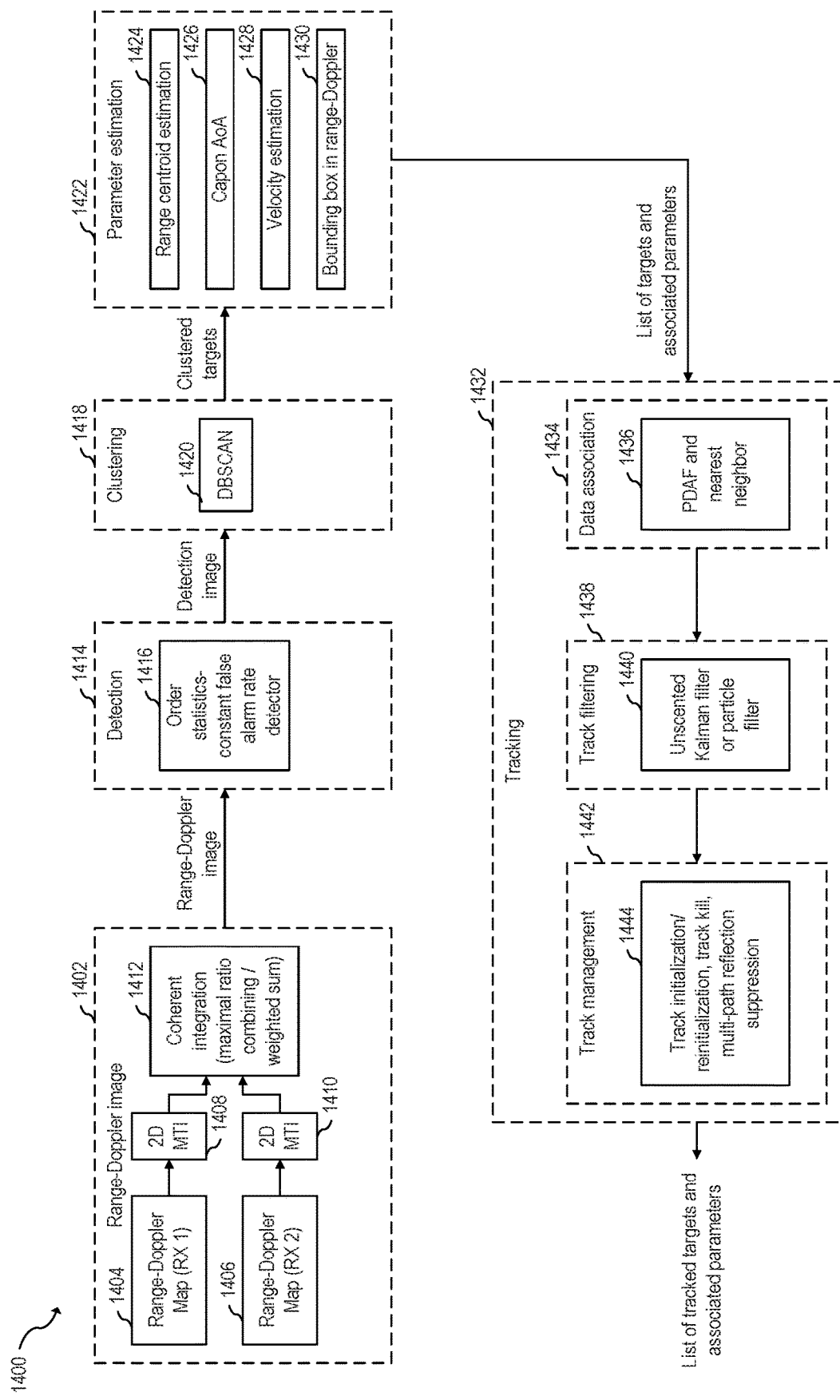
FIGS. 14 and 15 show flow charts of embodiment methods for detecting and tracking human targets, according embodiments of the present invention.

FIG. 14 shows a flow chart of embodiment method 1400 for detecting and tracking human targets, according to an embodiment of the present invention. Method 1400 may be implemented, e.g., by millimeter-wave radar system 100.

During step 1402, a range-Doppler image is generated based on radar signals received by millimeter-wave radar 100. For example, in an embodiment, a millimeter-wave radar having two receiving antennas (RX1 and RX2) receive radar signals from the field of view (e.g., from reflections from human targets) and generate respective range-Doppler maps during steps 1404 and 1406, respectively. During steps 1408 and 1410, 2D MTI filters are applied to respective range-Doppler maps, which results are coherently integrated during step 1412. An example image generated by step 1402 is the image shown in FIG. 3A.

After coherent integration, a range-Doppler image is generated during step 1412. During step 1414, detection of potential targets is performed. For example, in some embodiments, an order statistics (OS) constant false alarm rate (CFAR) (OS-CFAR) detector is performed during step 1416. The CFAR detector generates a detection image in which, e.g., "ones" represent targets and "zeros" represent non-targets based, e.g., on the power levels of the range-Doppler image. For example, in some embodiments, the CFAR detector compares the power levels of the range-Doppler image with a threshold, and points above the threshold are labeled as targets while points below the threshold are labeled as non-targets. Although targets may be indicated by ones and non-targets may be indicated by zeros, it is understood that other values may be used to indicate targets and non-targets.

In an embodiment, the OS-CFAR uses k-th quartile/median instead of mean CA-CFAR (cell average). Using the k-th quartile/median may advantageously be more robust to outliers.

Targets present in the detection image are clustered during step 1418 to generate clustered targets. For example, in an embodiment, a density-based spatial clustering of applications with noise (DBSCAN) algorithm is used associate targets to clusters during step 1420. The output of DBSCAN is a grouping of the detected points into particular targets. DBSCAN is a popular unsupervised algorithm, which uses minimum points and minimum distance criteria to cluster targets, and may be implemented in any way known in the art. Other clustering algorithms may also be used.

An example image generated by step 1418 is the image shown in FIG. 3B.

During step 1422, parameter estimations for each target is generated, e.g., using one or more of Equations 2-9. During step 1424, an estimation of the centroid of the range of the range of each target cluster is performed (e.g., px and py in Equations 2-9). During step 1426, angle of arrival (AoA) is estimated for each target. For example, in some embodiments, a minimum variance Distortionless (MVDR) technique, also known as Capon, may be used to determined angle of arrival during step 1426. Other methods may also be used.

Velocity estimation for each target is determined during step 1428. In some embodiments, the velocity estimation corresponds to $v_c$ in Equations 2-9.

During step 1430, the bounding box in range-Doppler is determined. For example, parameters of the bounding box, such as dimensions (e.g., lx and ly), and rate of change in dimensions (e.g., vlx and vly) are determined during step 1430. The area surrounded by the bounding box includes spread in Doppler and range of the detected human target, from which micro-Doppler signature data can be extracted. An example of a bounding box determined during step 1430 is shown, e.g., in FIG. 4B.

As shown in FIG. 14, a list of targets and associated parameters is generated during step 1422. During step 1432, tracking of the list of targets is performed. During step 1434, detected targets are associated with respective tracks. For example, during step 1436, a method such as method 1300 is used to associate detected targets to tracks.

During step 1438, track filtering is performed. For example, in some embodiments, the unscented Kalman filter or a particle filter is used to perform track filtering during step 1440. For example, the unscented Kalman filter may be used to predict the range, angle, bounding box dimensions, and other parameters associated with the track based on the history of the track (e.g., based preceding detection points) and based on new measurements received. The unscented Kalman filter or a particle filter may be implemented in any way known in the art.

During step 1442, track management tasks, such as generating tracks and killing tracks is performed. For example, during step 1444, track initializations, reinitialization, tracks killing and/or multi-path reflection suppression may be performed using methods 750, 850, and/or 1000, and/or a combination thereof. As shown in FIG. 14, a list of tracked targets and associated parameters is generated during step 1432.

Figure 15:
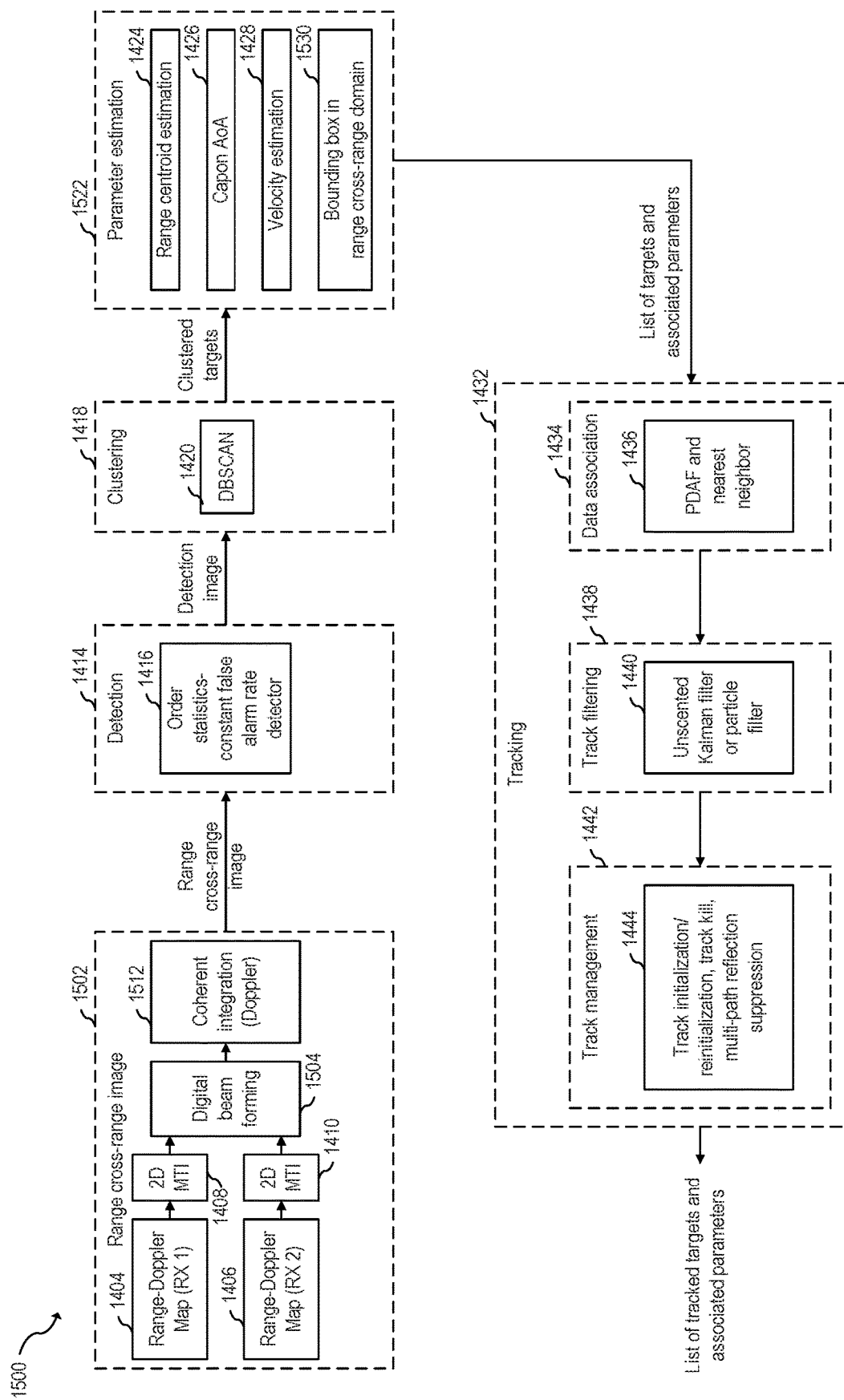

FIG. 15 shows a flow chart of embodiment method 1500 for detecting and tracking human targets, according to an embodiment of the present invention. Method 1500 may be implemented, e.g., by millimeter-wave radar system 100 and may be implemented in a similar manner as method 1400. Method 1500, however, generates a range cross-range image during step 1502 instead of generating a range-Doppler image. Method 1500 also determines the bounding box in range cross-range domain during step 1530 instead of the bounding box in range-Doppler domain. Compared to bounding box in range-Doppler domain, which represents/captures the micro-Doppler components and the range spread of the detected target, the bounding box in range cross-range image captures the physical appearance/spread of the human target.

Figure 16:
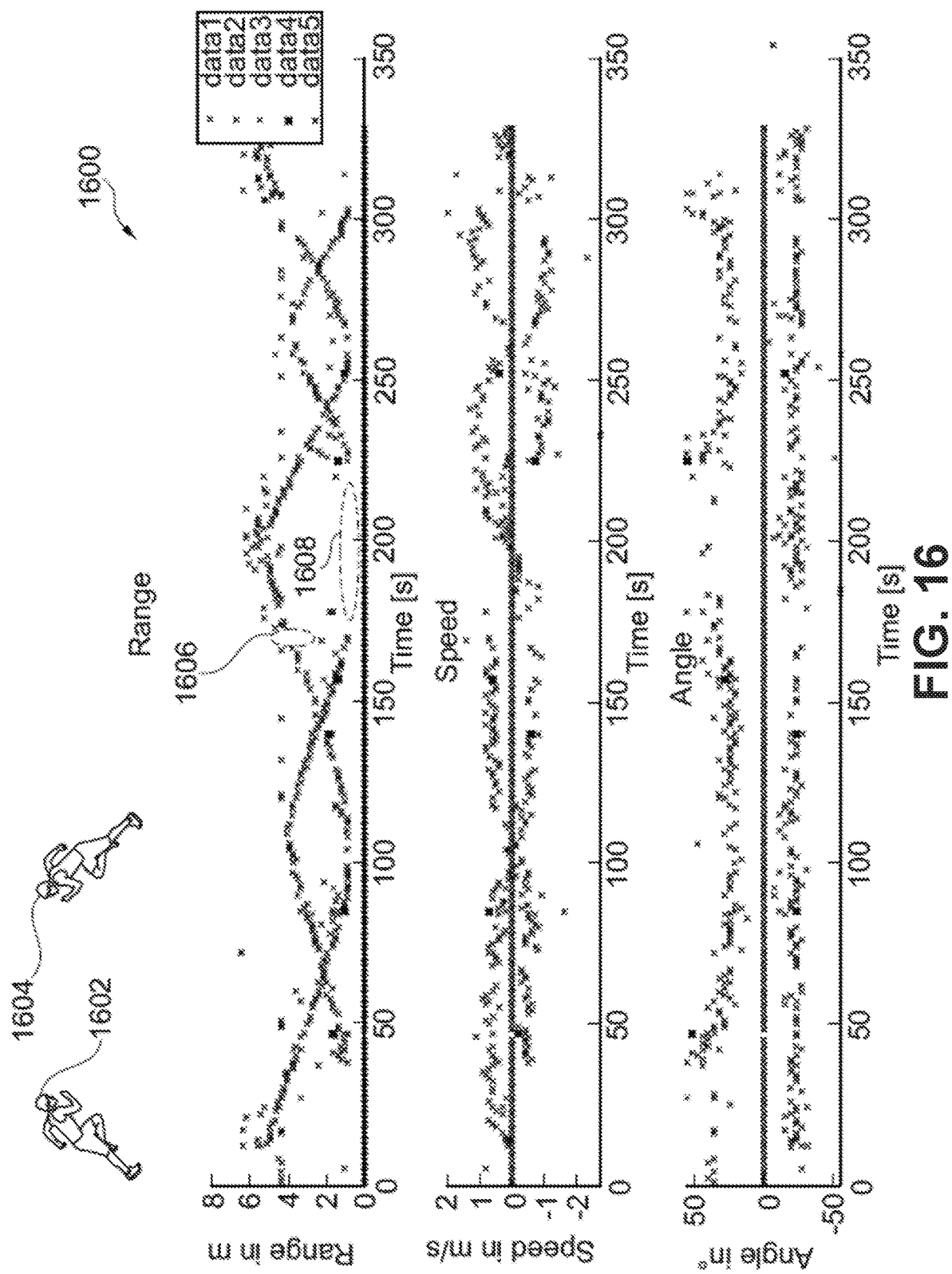
FIG. 16 shows detection results of two people cross walking in an indoor environment, according to an embodiment of the present invention.

FIG. 16 shows detection results 1600 of two people cross walking in an indoor environment, according to an embodiment of the present invention. Data 1 and 2 correspond to detections of human targets 1602 and 1604, respectively. Detection results 1600 may be generated, e.g., in steps 1422 or 1522. As shown in FIG. 16, the detection results exhibit missed detections, such as in areas 1606 and 1608.

In some embodiments, e.g., as shown in FIG. 16, up to 5 human targets (e.g., Data 1 to 5) may be simultaneously tracked. In other embodiments, the maximum number of human targets may be higher than 5, such as 7, 10, or higher, or lower than 5, such as 3, 2, or 1.

Figure 17:
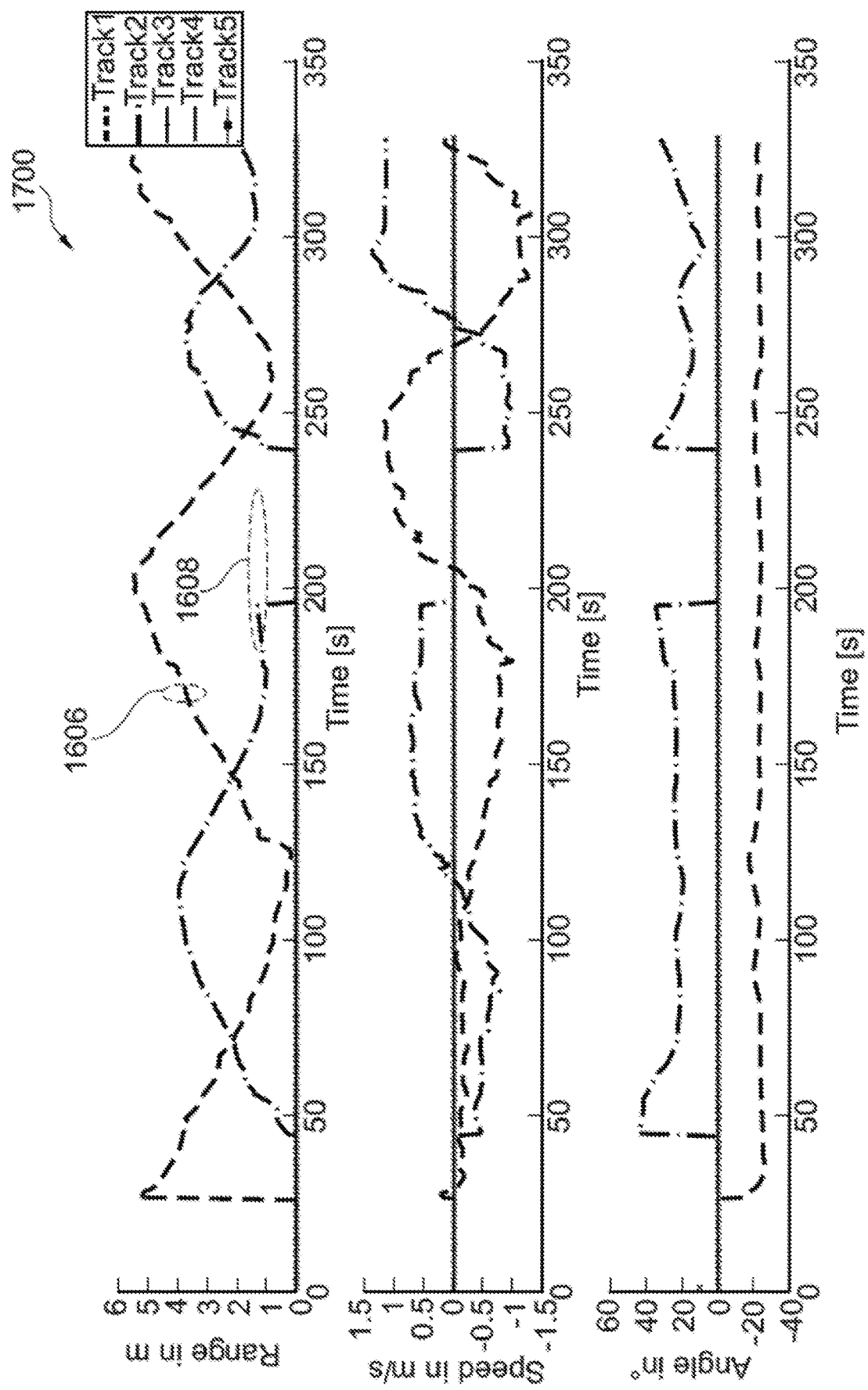
FIG. 17 shows tracking results of the two people of FIG. 16, according to an embodiment of the present invention.

FIG. 17 shows tracking results 1700 of the two people of FIG. 16, according to an embodiment of the present invention. As shown in FIG. 17, after performing step 1432, the missing points of area 1606 were replaced by estimates and the track 1 associated with human target 1602, continued to track human target 1602. As also shown in FIG. 17, although the track 2, associated with human target 1604, has multiple missed detections in area 1608, the track 2 was not killed, and continued tracking human target 1604 once human target 1604 was detected again.

Figure 18:
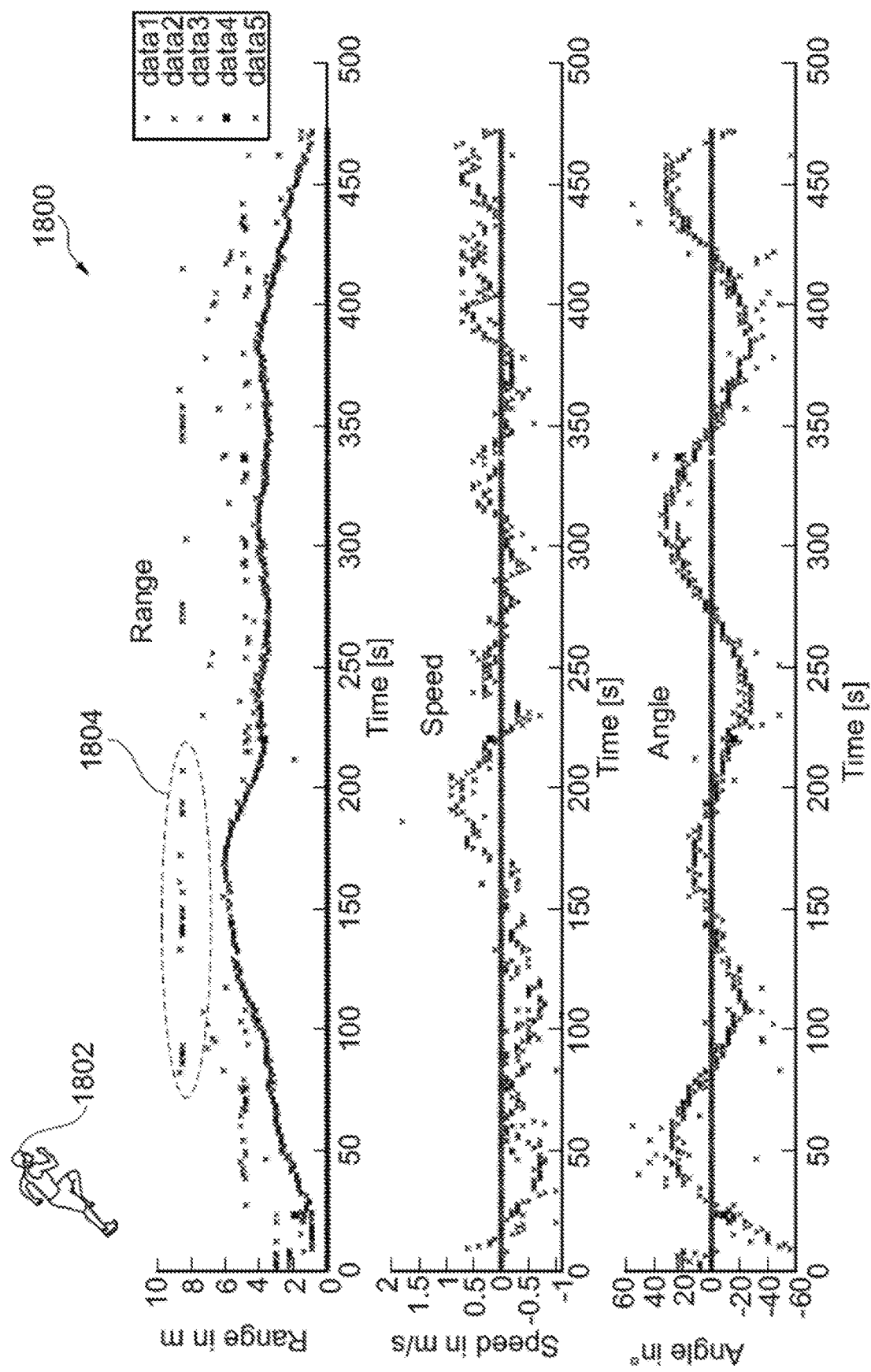
FIG. 18 shows detection results of one person walking in a zigzag manner in an indoor environment, according to an embodiment of the present invention.

FIG. 18 shows detection results 1800 of one person walking in a zigzag manner in an indoor environment, according to an embodiment of the present invention. Data 1 corresponds to detections of human targets 1802. Detection results 1800 may be generated, e.g., in steps 1422 or 1522. As shown in FIG. 18, the detection results exhibit false alarms, such as in area 1804.

Figure 19:
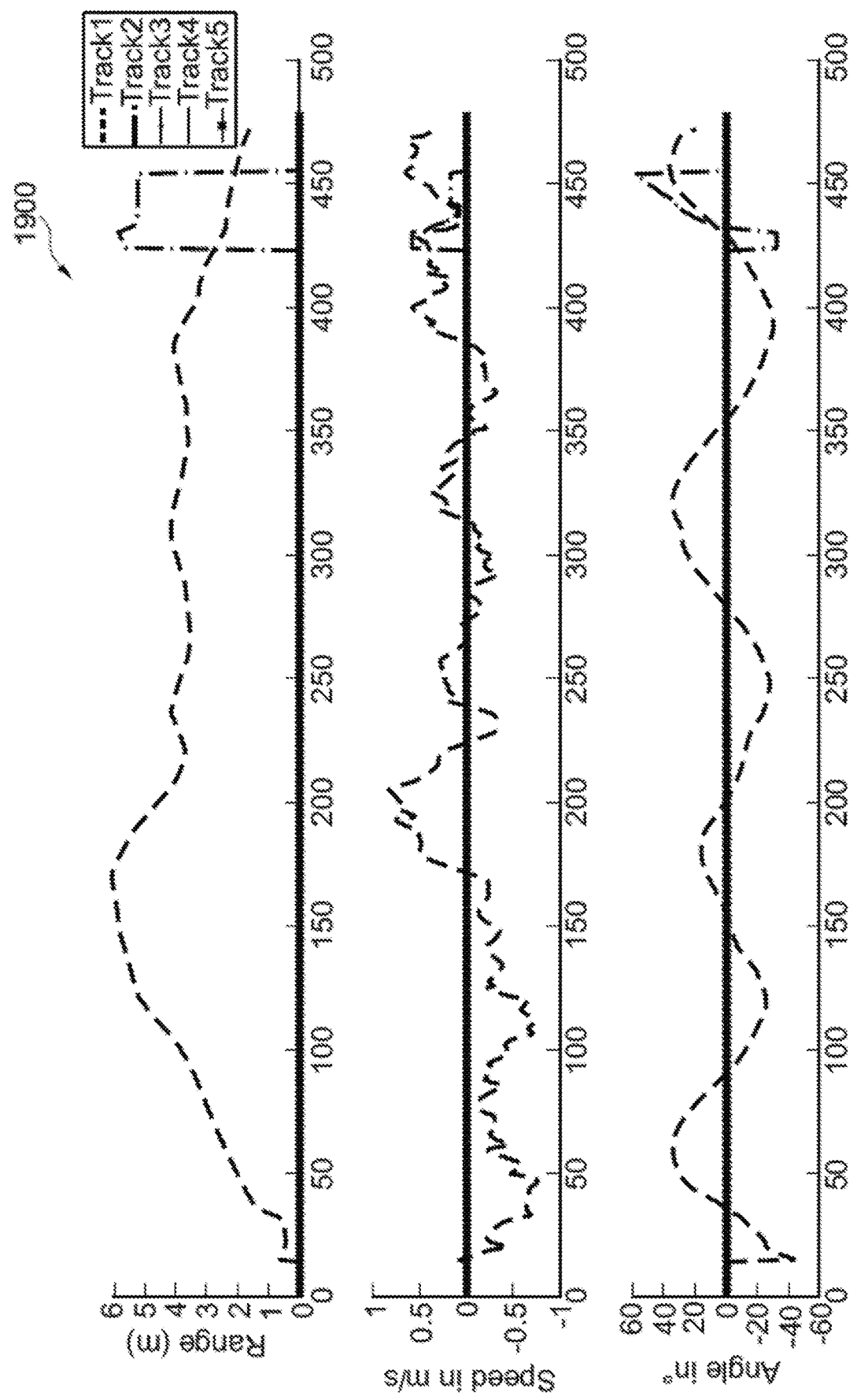
FIG. 19 shows tracking results of the person of FIG. 18, according to an embodiment of the present invention.

FIG. 19 shows tracking results 1900 of the person of FIG. 18, according to an embodiment of the present invention. As shown in FIG. 19, after performing step 1432, the false alarms of area 1804 were removed.

Example embodiments of the present invention are summarized here. Other embodiments can also be understood from the entirety of the specification and the claims filed herein.

EXAMPLE 1

A method for tracking human targets, the method including: receiving radar signals using a radar sensor; generating a range-Doppler map based on the received radar signals; detecting a human target based on the range-Doppler map, where detecting the human target includes determining a range and a bounding box dimension of a bounding box bounding the detected human target, the bounding box at least partially surrounding the detected human target; and when the determined range is inside an expected region associated to a track, adding to the track a new detection point including the determined range and bounding box dimension, where the expected region is determined based on bounding box dimensions of detection points of the track.

EXAMPLE 2

The method of example 1, where the bounding box has a rectangular shape that surrounds hands, torso, and feet of the detected human target, and where the bounding box dimension is a length of a side of the rectangular shape.

EXAMPLE 3

The method of one of examples 1 or 2, further including: predicting a range of the detected human target based on the track; and determining the expected region based on the prediction.

EXAMPLE 4

The method of one of examples 1 to 3, where predicting the range of the detected human target includes predicting the range of the detected human target based on changes in the bounding box dimension of the detected human target.

EXAMPLE 5

The method of one of examples 1 to 4, where each detection point of the track includes an angle value of the detected human target.

EXAMPLE 6

The method of one of examples 1 to 5, further including, when no target detections are inside the expected region, adding to the track the new detection point includes adding the new detection point to the track based on the predicted range of the detected human target.

EXAMPLE 7

The method of one of examples 1 to 6, where predicting the range of the detected human target includes using an unscented Kalman filter.

EXAMPLE 8

The method of one of examples 1 to 7, further including killing the track when a first N consecutive detection points of the track include less than M confirmed detections of the human target, where N is a positive integer greater than 1, and where M is a positive integer lower than N.

EXAMPLE 9

The method of one of examples 1 to 8, where N is equal to 8 and M is equal to 5.

EXAMPLE 10

The method of one of examples 1 to 9, further including killing the track after S consecutive detection points of the track are missed detections of the human target, where S is a positive integer greater than 1.

EXAMPLE 11

The method of one of examples 1 to 10, further including determining a micro-Doppler signature data of the detected human target based on the range-Doppler map, where detecting the human target includes detecting the human target when the micro-Doppler signature data is indicative of a presence of the human target.

EXAMPLE 12

The method of one of examples 1 to 11, where the micro-Doppler signature data is indicative of a breathing rate of the detected human target.

EXAMPLE 13

The method of one of examples 1 to 12, where determining the micro-Doppler signature data includes using the bounding box dimension.

EXAMPLE 14

The method of one of examples 1 to 13, further including: detecting a second human target based on the range-Doppler map, where detecting the second human target includes determining a second range and a second bounding box dimension of a second bounding box; and when the determined second range is inside an second expected region associated to a second track, adding to the second track a new detection point including the determined second range and second bounding box dimension.

EXAMPLE 15

The method of one of examples 1 to 14, further including: generating a second range-Doppler map based on the received radar signals; detecting a third human target based on the second range-Doppler map, where detecting the third human target includes determining a third range and a third bounding box dimension of a third bounding box; generating a new first expected region based on the track; generating a new second expected region based on the second track; when the determined third range is inside the new first expected region and the new second expected region, adding to the track or the second track a new detection point including the determined third range and third bounding box dimension using a nearest neighbor algorithm; and when the determined third range is inside the new first expected region and outside the new second expected region, or when the determined third range is inside the new second expected region and outside the new first expected region, adding to the track or the second track a new detection point including the determined third range and third bounding box dimension using a probabilistic data association filter (PDAF).

EXAMPLE 16

The method of one of examples 1 to 15, further including: determining a correlation value between the track and the second track; determining a closer track and a further track between the track and the second track, where the closer track is the one track of the track and the second track that is closer to the radar sensor, and the further track is the other track of the track and the second track; and deleting the further track when the correlation value is greater than a correlation threshold.

EXAMPLE 17

The method of one of examples 1 to 16, where the correlation threshold is about 0.6.

EXAMPLE 18

The method of one of examples 1 to 17, where determining the bounding box dimension includes determining the bounding box dimension in a range-Doppler domain.

EXAMPLE 19

The method of one of examples 1 to 18, where determining the bounding box dimension includes determining the bounding box dimension in a range cross-range domain.

EXAMPLE 20

A millimeter-wave radar system including: a radar sensor; and a processor configured to: transmit radar signals using the radar sensor, receive reflected radar signals using the radar sensor, generate a range-Doppler map based on the received reflected radar signals, detect a human target based on the range-Doppler map, where detecting the human target includes determining a range and a bounding box dimension of a bounding box of the detected human target, the bounding box at least partially surrounding the detected human target, and when the determined range is inside an expected region associated to a track, add to the track a new detection point including the determined range and bounding box dimension, where the expected region is determined based on bounding box dimensions of detection points of the track.

EXAMPLE 21

A method for simultaneously tracking a plurality of human targets, the method including: receiving radar signals using a radar sensor; generating a range-Doppler map based on the received radar signals; detecting a human target based on the range-Doppler map, where detecting the human target includes determining a range; generating a first expected region based on a first track associated to a first human target; generating a second expected region based on a second track associated to a second human target; when the determined range is inside the first expected region and the second expected region, adding to the first track or the second track a new detection point including the determined range using a nearest neighbor algorithm; and when the determined range is inside the first expected region and outside the second expected region, or when the determined range is inside the second expected region and outside the first expected region, adding to the first track or the second track a new detection point including the determined range using a probabilistic data association filter (PDAF).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for tracking human targets, the method comprising:
    receiving radar signals using a radar sensor;
    generating a range-Doppler map based on the received radar signals;
    detecting a human target based on the range-Doppler map, wherein detecting the human target comprises determining a range and a bounding box dimension of a bounding box, the bounding box at least partially surrounding a spread in range of the detected human target; and
    when the determined range is inside an expected region associated to a first track, adding to the first track a new detection point comprising the determined range and bounding box dimension, wherein the expected region is determined based on bounding box dimensions of detection points of the first track.

2. The method of claim 1, wherein the bounding box has a rectangular shape that surrounds the spread in Doppler and range of hands, torso, and feet of the detected human target, and wherein the bounding box dimension is a length of a side of the rectangular shape.

3. The method of claim 1, further comprising:
    predicting a range of the detected human target based on the first track; and
    determining the expected region based on the prediction.

4. The method of claim 3, wherein predicting the range of the detected human target comprises predicting the range of the detected human target based on changes in the bounding box dimension associated with the detected human target.

5. The method of claim 3, wherein each detection point of the first track comprises an angle value of the detected human target.

6. The method of claim 3, further comprising, when no target detections are inside the expected region, adding to the first track the new detection point comprises adding the new detection point to the first track based on the predicted range of the detected human target.

7. The method of claim 3, wherein predicting the range of the detected human target comprises using an unscented Kalman filter.

8. The method of claim 1, further comprising killing the first track when a first N consecutive detection points of the first track comprise less than M confirmed detections of the human target, wherein N is a positive integer greater than 1, and wherein M is a positive integer lower than N.

9. The method of claim 8, wherein N is equal to 8 and M is equal to 5.

10. The method of claim 1, further comprising killing the first track after S consecutive detection points of the first track are missed detections of the human target, wherein S is a positive integer greater than 1.

11. The method of claim 1, further comprising determining a micro-Doppler signature data of the detected human target based on the range-Doppler map, wherein detecting the human target comprises detecting the human target when the micro-Doppler signature data is indicative of a presence of the human target.

12. The method of claim 11, wherein the micro-Doppler signature data is indicative of a breathing rate of the detected human target.

13. The method of claim 11, wherein determining the micro-Doppler signature data comprises using the bounding box dimension.

14. The method of claim 1, further comprising:
    detecting a second human target based on the range-Doppler map, wherein detecting the second human target comprises determining a second range and a second bounding box dimension of a second bounding box; and
    when the determined second range is inside a second expected region associated to a second track, adding to the second track a new detection point comprising the determined second range and second bounding box dimension.

15. The method of claim 14, further comprising:
generating a second range-Doppler map based on the received radar signals;
detecting a third human target based on the second range-Doppler map, wherein detecting the third human target comprises determining a third range and a third bounding box dimension of a third bounding box;
generating a new first expected region based on the first track;
generating a new second expected region based on the second track;
when the determined third range is inside the new first expected region and the new second expected region, adding to the first track or the second track a new detection point comprising the determined third range and third bounding box dimension using a nearest neighbor algorithm; and
when the determined third range is inside the new first expected region and outside the new second expected region, or when the determined third range is inside the new second expected region and outside the new first expected region, adding to the first track or the second track a new detection point comprising the determined third range and third bounding box dimension using a probabilistic data association filter (PDAF).

16. The method of claim 14, further comprising:
determining a correlation value between the first track and the second track;
determining a closer track and a further track between the first track and the second track, wherein the closer track is the one track of the first track and the second track that is closer to the radar sensor, and the further track is the other track of the first track and the second track; and
deleting the further track when the correlation value is greater than a correlation threshold.

17. The method of claim 16, wherein the correlation threshold is about 0.6.

18. The method of claim 1, wherein determining the bounding box dimension comprises determining the bounding box dimension in a range-Doppler domain, and wherein the bounding box at least partially surrounds a spread in Doppler and range of the detected human target.

19. The method of claim 1, wherein determining the bounding box dimension comprises determining the bounding box dimension in a range cross-range domain.

20. A millimeter-wave radar system comprising:
a radar sensor; and
a processor configured to:
transmit radar signals using the radar sensor,
receive reflected radar signals using the radar sensor,
generate a range-Doppler map based on the received reflected radar signals,
detect a human target based on the range-Doppler map, wherein detecting the human target comprises determining a range and a bounding box dimension of a bounding box of the detected human target, the bounding box at least partially surrounding a spread in range of the detected human target, and
when the determined range is inside an expected region associated to a track, add to the track a new detection point comprising the determined range and bounding box dimension, wherein the expected region is determined based on bounding box dimensions of detection points of the track.

21. A method for simultaneously tracking a plurality of human targets, the method comprising:
receiving radar signals using a radar sensor;
generating a range-Doppler map based on the received radar signals;
detecting a human target based on the range-Doppler map, wherein detecting the human target comprises determining a range;
generating a first expected region based on a first track associated to a first human target;
generating a second expected region based on a second track associated to a second human target;
when the determined range is inside the first expected region and the second expected region, adding to the first track or the second track a new detection point comprising the determined range using a nearest neighbor algorithm; and
when the determined range is inside the first expected region and outside the second expected region, or when the determined range is inside the second expected region and outside the first expected region, adding to the first track or the second track a new detection point comprising the determined range using a probabilistic data association filter (PDAF).

* * * * *